US012737750B2

(12) United States Patent
Osborn et al.

(10) Patent No.: US 12,737,750 B2
(45) Date of Patent: Sep. 15, 2026

(54) SYTEMS AND METHODS TO PERFORM REGISTRATION OPERATIONS WITH CONTACTLESS CARDS

(71) Applicant: Capital One Services, LLC, McLean, VA (US)

(72) Inventors: Kevin Osborn, Newton Highlands, MA (US); Narmeen Rahman, New York, NY (US); Marianne Huang, Palo Alto, CA (US); John Jones, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/199,975

(22) Filed: May 6, 2025

(65) Prior Publication Data

US 2025/0342456 A1 Nov. 6, 2025

Related U.S. Application Data

(60) Provisional application No. 63/643,176, filed on May 6, 2024.

(51) Int. Cl.
*G06Q 20/34* (2012.01)

(52) U.S. Cl.
CPC .................................. *G06Q 20/355* (2013.01)

(58) Field of Classification Search
CPC .................................................... G06Q 20/355
USPC .......................................................... 235/380
See application file for complete search history.

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |
| 6,199,114 | B1 | 3/2001 | White |
| 6,324,271 | B1 | 11/2001 | Sawyer |
| 6,367,011 | B1 | 4/2002 | Lee |
| 6,572,015 | B1 | 6/2003 | Norton |
| 7,252,242 | B2 | 8/2007 | Ho |
| 7,270,276 | B2 | 9/2007 | Vayssiere |

(Continued)

FOREIGN PATENT DOCUMENTS

| | | | |
|---|---|---|---|
| CN | 101192295 | A | 6/2008 |
| GB | 2516861 | A | 2/2015 |

(Continued)

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

(Continued)

*Primary Examiner* — Allyson N Trail
(74) *Attorney, Agent, or Firm* — KDW Firm, PLLC

(57) ABSTRACT

Embodiments cover registering, deregistering, and checking the status of contactless cards. A personalization system creates card data, including identifiers, for new and replacement cards, which are registered or deregistered as needed. A validation system verifies card activity and validity by processing queries with identifiers and encrypted data. Embodiments further include a system that manages contactless card registrations and billing via a card registration database to maintain card data, an API for registration and status updates, and a billing module to calculate charges for issuers.

20 Claims, 21 Drawing Sheets

(56) References Cited

U.S. PATENT DOCUMENTS 7,287,692 B1 10/2007 Patel
7,374,099 B2 5/2008 de Jong
7,527,208 B2 5/2009 Hammad
7,568,631 B2 8/2009 Gibbs
7,584,153 B2 9/2009 Brown
7,628,322 B2 12/2009 Holtmanns
7,793,851 B2 9/2010 Mullen
7,801,799 B1 9/2010 Brake, Jr.
7,908,216 B1 3/2011 Davis
7,922,082 B2 4/2011 Muscato
8,010,405 B1 8/2011 Bortolin
8,074,877 B2 12/2011 Mullen
8,082,450 B2 12/2011 Frey
8,108,687 B2 1/2012 Ellis
8,186,602 B2 5/2012 Itay
8,196,131 B1 6/2012 von Behren
8,249,654 B1 8/2012 Zhu
8,276,814 B1 10/2012 Davis
8,332,272 B2 12/2012 Fisher
8,346,670 B2 1/2013 Hasson
8,511,547 B2 8/2013 Rans
8,519,822 B2 8/2013 Riegebauer
8,750,514 B2 6/2014 Gallo
8,870,081 B2 10/2014 Olson
9,038,893 B2 5/2015 Kirkham
9,129,199 B2 9/2015 Spodak
9,183,490 B2 11/2015 Moreton
9,275,325 B2 3/2016 Newcombe
9,286,606 B2 3/2016 Diamond
9,306,753 B1 4/2016 Vandervort
9,501,776 B2 11/2016 Martin
9,710,744 B2 7/2017 Wurmfeld
9,949,065 B1 4/2018 Zarakas
9,965,632 B2 5/2018 Zarakas
9,965,911 B2 5/2018 Wishne
9,977,890 B2 5/2018 Alberti
9,978,056 B2 5/2018 Seo
9,978,058 B2 5/2018 Wurmfeld
9,990,795 B2 6/2018 Wurmfeld
10,007,873 B2 6/2018 Heo
10,013,693 B2 7/2018 Wyatt
10,121,130 B2 11/2018 Pinski
10,210,505 B2 2/2019 Zarakas
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
11,948,150 B1 * 4/2024 Chigurupati ....... G06Q 20/3821
11,971,862 B1 * 4/2024 Han ..................... G06Q 20/401
12,450,591 B1 * 10/2025 Cook .................. G06Q 20/409
2003/0220876 A1 11/2003 Burger
2005/0156026 A1 7/2005 Ghosh
2005/0228997 A1 10/2005 Bicker
2005/0269402 A1 12/2005 Spitzer
2007/0276765 A1 11/2007 Hazel
2008/0082452 A1 4/2008 Wankmueller
2008/0099552 A1 5/2008 Grillion
2008/0223921 A1 9/2008 Salazar
2009/0143104 A1 6/2009 Loh
2009/0235339 A1 9/2009 Mennes
2009/0282264 A1 11/2009 Amiel
2011/0113245 A1 5/2011 Varadarajan
2011/0155801 A1 6/2011 Rowberry
2012/0143703 A1 6/2012 Wall
2013/0030997 A1 1/2013 Spodak
2013/0146657 A1 6/2013 Graef
2013/0211937 A1 8/2013 Elbirt
2013/0311363 A1 11/2013 Ramaci
2014/0032409 A1 1/2014 Rosano
2014/0074637 A1 3/2014 Hammad
2014/0074655 A1 3/2014 Lim
2014/0081785 A1 3/2014 Valadas Preto
2014/0365377 A1 12/2014 Salama
2015/0032626 A1 1/2015 Dill
2015/0032635 A1 1/2015 Guise
2015/0073983 A1 3/2015 Bartenstein
2015/0113271 A1 4/2015 Jooste
2015/0134513 A1 5/2015 Olson
2015/0199673 A1 7/2015 Savolainen
2015/0199863 A1 7/2015 Scoggins
2015/0254637 A1 9/2015 Yang
2015/0294290 A1 * 10/2015 Jeong ................. G06Q 20/3278
705/17
2015/0317295 A1 11/2015 Sherry
2016/0078430 A1 3/2016 Douglas
2016/0189143 A1 6/2016 Koeppel
2016/0253651 A1 9/2016 Park
2016/0277383 A1 9/2016 Guyomarc'h
2016/0307189 A1 10/2016 Zarakas
2016/0314472 A1 10/2016 Ashfield
2016/0379217 A1 12/2016 Hammad
2017/0017957 A1 1/2017 Radu
2017/0039566 A1 2/2017 Schipperheijn
2017/0068950 A1 3/2017 Kwon
2017/0330173 A1 11/2017 Woo
2018/0039987 A1 2/2018 Molino
2018/0268132 A1 9/2018 Buer
2018/0300716 A1 10/2018 Carlson
2019/0172055 A1 6/2019 Hale
2019/0303945 A1 10/2019 Mitra
2020/0302436 A1 * 9/2020 Ilincic .................. G06Q 20/405
2021/0004806 A1 1/2021 Noe
2021/0272098 A1 9/2021 Delsuc
2021/0304189 A1 9/2021 Gupta
2021/0383360 A1 12/2021 Sinha
2021/0406869 A1 12/2021 Pathrabe
2022/0014912 A1 * 1/2022 Wilson ............... G06Q 20/3574
2022/0114581 A1 4/2022 Upadhye
2022/0247741 A1 * 8/2022 Moreton ................ G07F 7/122

(56) References Cited

U.S. PATENT DOCUMENTS

| | | | | |
|---|---|---|---|---|
| 2022/0284416 | A1 | 9/2022 | Rule | |
| 2022/0300923 | A1* | 9/2022 | Bobo | G06Q 20/4012 |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |
| 2023/0401564 | A1* | 12/2023 | Barrett | G06Q 20/027 |
| 2024/0013168 | A1* | 1/2024 | Oei | G06Q 20/06 |
| 2024/0054498 | A1* | 2/2024 | Sinha | G06Q 20/202 |
| 2024/0086895 | A1* | 3/2024 | Geiger | G06Q 20/355 |
| 2025/0014018 | A1* | 1/2025 | Oni | G05B 19/4099 |
| 2025/0094759 | A1* | 3/2025 | Blackstone | G06K 19/0718 |
| 2025/0131424 | A1* | 4/2025 | Roberts | G06Q 20/389 |
| 2025/0233738 | A1* | 7/2025 | Osborn | H04L 9/0861 |

FOREIGN PATENT DOCUMENTS

| | | | |
|---|---|---|---|
| GB | 2551907 | A | 1/2018 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

EMVCo, LLC, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

EMVCo, LLC, "EMV Card Personalisation Specification," Aug. 1, 2021, retrieved from the Internet URL: https://www.emvco.com/specification/?post_id=12467, 114 pages.

EMVCo, LLC, "EMV Card Personalization Specification," Specification version 1.0, (2003) 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_2016080902325 . . . , 52 pages.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

The International Search Report and Written Opinion mailed Sep. 5, 2025 for corresponding PCT/US2025/028386 (12 pages).

* cited by examiner

SYTEMS AND METHODS TO PERFORM REGISTRATION OPERATIONS WITH CONTACTLESS CARDS

BACKGROUND

Contactless card products have become so universally well-known and ubiquitous that they have fundamentally changed the way financial transactions and dealings are viewed and conducted in society today. Contactless card products are most commonly represented by plastic or metal card-like members that are offered and provided to customers through credit card issuers (such as banks and other financial institutions). With a card, an authorized customer or cardholder is capable of purchasing services and/or merchandise without an immediate, direct exchange of cash. Data security and transaction integrity are of critical importance to businesses facilitating these transactions and to the customers. This need continues to grow as electronic transactions performed with contactless cards constitute an increasingly large share of commercial activity. Accordingly, there is a need to provide businesses and users with an appropriate solution that overcomes current deficiencies to provide data security, authentication, and verification for contactless card.

BRIEF SUMMARY

Embodiments may be generally directed to registering, deregistering, and determining a status of a contactless card. Embodiments include a personalization system that generates card data for a new contactless card, which includes an issuer identifier and a unique identifier. This card data is then sent to a registration system for registration of the new contactless card. Finally, the personalization system provides the generated card data to the new contactless card.

Embodiments further include the personalization system generating card data for a replacement contactless card, including an issuer identifier (identifying the issuer of both the replaced and replacement cards), a unique identifier (for the replacement card), and a second unique identifier (for the replaced card). This card data is sent to a registration system to register the replacement card and deactivate the replaced card. Finally, the personalization system provides the issuer identifier and the unique identifier to the replacement contactless card. In embodiments, the registration system may register the new or replacement contactless card with a processing system, such as the system 1000, including validation systems.

Embodiments further include a validation system that receives a query from a computing device that includes an issuer identifier and a unique identifier to validate the card and check if a contactless card is active. The system identifies the card using the unique identifier, determines its valid and an active status, and then responds with an indication of whether or not the contactless card is active and valid. Embodiments include a validation system hat receives encrypted data from a contactless card through a computing device, determines that the card is active, and then validates at least a portion of the encrypted data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
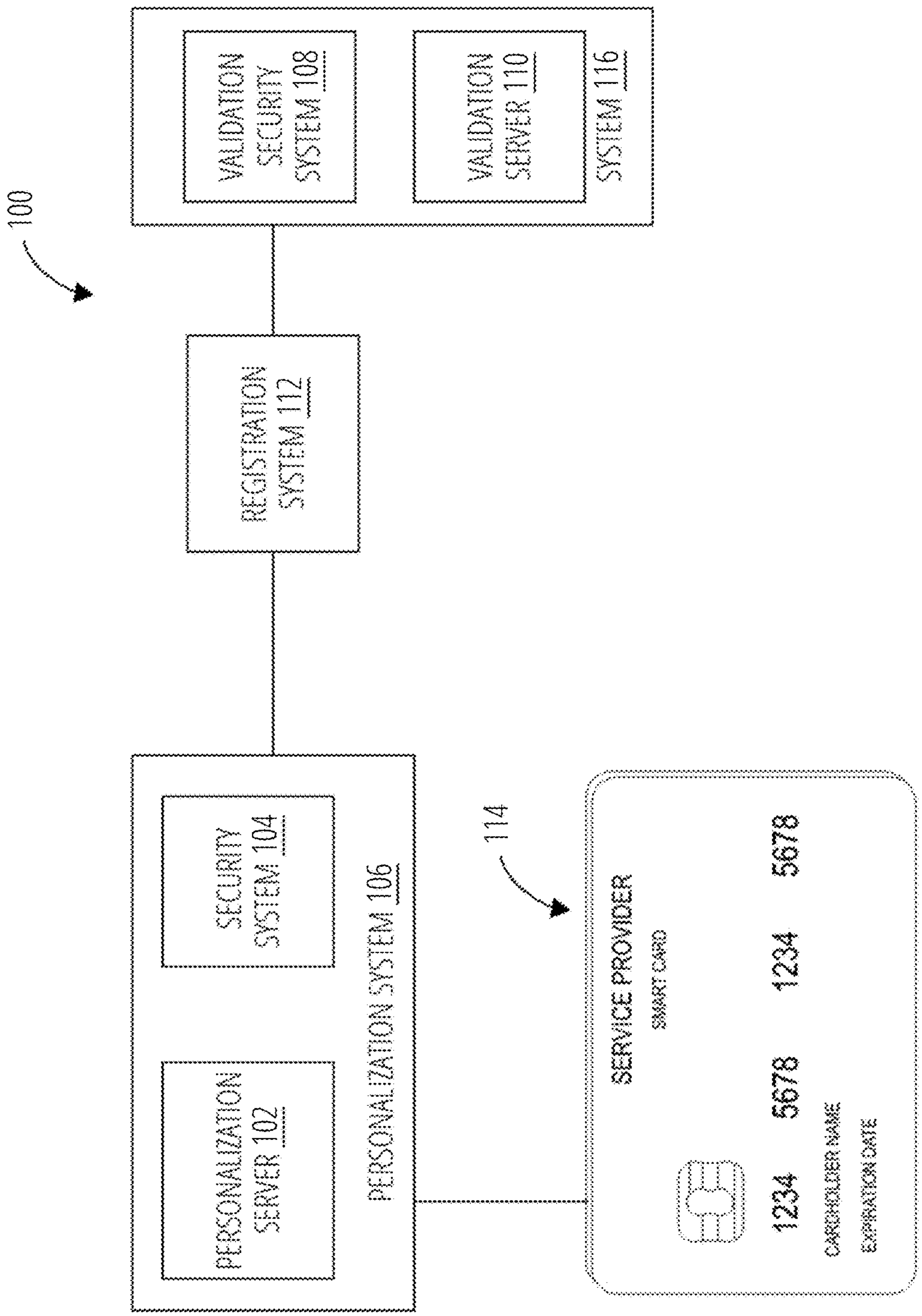
FIG. 1 illustrates an aspect of the subject matter in accordance with one embodiment.

Systems discussed herein enable a contactless card issuer to install an applet on a physical card, such as a contactless card, that can be used like a hardware authenticator to verify a user's identity, which a validator is linked to at the time of manufacturing. As data is generated as part of the personalization process, the newly enabled cards are registered, and the data is communicated to other networks, such as a validation network and/or transaction network. Thus, only registered cards can be successfully validated.

In embodiments, systems discussed herein utilize Near Field Communication (NFC) between contactless credit cards and computing devices to perform operations, such as authentication or validation. In one example, a custom applet is embedded in the card from which a mobile application on a computing device is configured to read encrypted data, such as cryptogram, that can be sent to a server for validation. The system uses a one-time, dynamic token; each time the card is tapped, the contactless card generates a new security token. The contactless card behaves as a hardware token linked to a bank-verified identity. Unlike other hardware tokens, contactless cards discussed herein are linked to the identity of the cardholders at the time of manufacturing during a process called card personalization. This creates an immutable association between the account holder and the token, in contrast to programmed token peripherals whose original provenance are unknown. A successful card tap verifies that the user is in possession of the card, and the information embedded on the card at the time of personalization is valid. Dynamic card validation provides additional confidence that the payment data is not obtained from illicit sources.

In some embodiments, systems discussed herein perform the personalization process and generate specific data for one or more contactless cards that can be included in embossing files to be added to the physical cards. For example, systems include generating a unique identifier (PUID) for each of the contactless cards and providing each card the identifier in an embossing file. Embodiments include registering cards to notify other systems, such as a validation system, that the contactless card is registered and can successfully validate card taps. Further, the card registration process ensures that the proper data can be collected to support potential billing models, such as pricing based on the number of cards issued or the number of successful taps. Systems also enable allow users to disable or deregister a card, such as when a replacement card is issued.

In some instances, systems discussed herein may utilize at least two different options to perform the card registration process, including utilizing one more application programming interfaces (APIs) to conduct the registration event and/or utilizing batch files incorporating data schema for card registration. Further, embodiments include performing card deregistration and replacement card registrations. For example, systems include generating a new unique identifier for a replacement card and unregistering the expired/replaced card's unique identifier in a database. As new cards are created, they will have to register the new cards from the issuer to make them known to other systems, such as the validation service provider.

Further, contactless card functions discussed herein may be utilized in a multi-issuer computing environment. For example, the systems discussed enable multiple issuer systems to generate new contactless cards, register the cards with the registration system, and perform validation/authentication functions. Additional functions may include tap-to functions where a user may tap their contactless card on a device, such as a mobile device, to perform a function. For example, a user may utilize their contactless card to verify their identity, perform a payment, launch applications, log into applications, autofill a form or field, navigate to a specified web location or app on a device, unlock a door, initiate a contactless card, verify themselves, and so forth.

The systems discussed here may enable users to perform these functions in a multi-issuer environment. Further, the systems discussed herein enable card issuers or payment providers, such as banks, to issue contactless cards with tap-to functions to customers while maintaining high-level security. The systems discussed differ from previous solutions because they provide a single platform for multiple issuers to provide the tap-to functionality. Traditionally, each issuer must set up and maintain its own systems to provide contactless card features. This includes maintaining their own hardware, software, databases, security protocols, and so forth, which can become extremely costly for the issuer to maintain. However, the embodiments discussed enable issuers to offload much of the processing, storage, and security functionality to a neutral or central system. As will be discussed in more detail, the central system is configured to provide contactless card features for multiple issuers while maintaining high security and data integrity. Each issuer's functionality and data may be separately managed and secured such that another issuer cannot access another issuer's data or functions. As will be discussed in more detail, these features may be provided by a switchboard system configured to process and perform each contactless card function securely. Additional benefits for issuers may include providing a highly secure authentication option for mobile web, which typically lacks the robust authentication options available in a native application.

Further, embodiments discussed herein support tap-to mobile web experiences on both major mobile platforms (iOS®, Android®) by leveraging App Clips® and Javascript® SDK with WebNFC®. For IOS®, embodiments include providing a tap-to software development kit including functions and services to perform the operations discussed herein on the iOS® platform. The SDK may be installed into the host application, e.g., a native app or web browser app, and includes App Clip® support. The SDK provides functional support for near-field communication between the mobile device and contactless card, installing a native app via App Clips®, and functionality to obscure data and/or portions of a display. In one example, the SDK may be configured to download and install the app from an app store, such as Apple's® App Store.

In the Android® operating system environment, embodiments include utilizing a JavaScript SDK. The JavaScript SDK may be installed into a website e.g., via source code. The JavaScript SDK also includes functions to support NFC communications between mobile devices and contactless cards via WebNFC®. The JavaScript SDK may also include functions to provide customizable user interface (UI) capabilities and obfuscation. In embodiments, the JavaScript SDK supports websites utilizing Hypertext Transfer Protocol Secure (HTTPS) and supports the React® library. Embodiments are not limited in this manner, and UI libraries may be supported.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 illustrates an example system 100 in accordance with the embodiments discussed herein. The system 100 includes a personalization system 106, a registration system 112, and an 116 to perform contactless card operations, such as validations and merchant transactions. In one example, the system 116 may be a switching or switchboard system as discussed and illustrated in FIG. 10.

The personalization system 106 may further include one or more personalization servers 102 and one or more personalization security systems 104. The personalization system 106 includes hardware and software components, such as personalization server 102, designed to encode and print physical or virtual credit cards with specific cardholder information. The personalization system 106 system integrates issuer identification data, cardholder account details, and security features into the card. It may include unique identifiers, customized card aesthetics, and embedded chips or magnetic stripes programmed with necessary financial and security protocols. The personalization system 106 ensures each card is tailored for individual cardholders while meeting issuer specifications and standards for security and functionality. Additionally, the system may support processes for activating and registering new or replacement cards with registration systems, ensuring the cards are ready for immediate use by the cardholders. In embodiments, the personalization system 106 may be an issuer system, and/or each issuer system may utilize a different personalization system. In other instances, one or more issuers may utilize a single personalization system 106.

In one example, the personalization system 106 includes a personalization server 102 to generate data, including the unique identifiers for contactless cards, where each contactless card is identified by its own unique identifier. The personalization server 102 may store the unique identifiers in a personalization security system 104. In example embodiments, the personalization security system 104 may be a hardware security module (HSM).

The personalization security system 104 may be a physical computing device that safeguards and manages data for the contactless cards including the unique identifiers and digital keys for strong authentication and provides crypto processing. In some embodiments, the personalization security system 104 securely generates, stores, and handles cryptographic keys and are used in applications requiring high levels of security, such as transaction processing, authentication and authorization processing, and digital signing.

In one example, the one or more of the keys may be based on the unique identifier and the issuer identifier. The personalization server 102 may generate additional data and store it on the personalization security system 104. For example, the personalization server 102 may also generate card data, an active as-of date, an expired as of date, and deactivate data. The personalization security system 104 may store the data in a database schema, such as:

Issuer ID,
PUID,
Active as-of,
Expired as-of,
Deactivated, and
Replaces PUID.

In embodiments, the personalization system 106 is capable of performing a registration process, a deregistration process, and replacement registration process with corresponding systems to enable those systems to perform operations. For example, the personalization system 106 may communicate data with the registration system 112 to perform the processes. Specifically, the personalization system 106 may communicate the issuer identifier, the unique identifier, and the expiration date to the registration system 112 to perform a registration process. The personalization system 106 may communicate the same data plus the deactivated unique identifier to the registration system 112 to perform a replacement registration process. In another example, the personalization system 106 may communicate an issue identifier and a unique identifier to deactivate or deregister a contactless card without a replacement card.

In embodiments, the personalization system 106 may send the data to the registration system 112 in one or more messages or communications. In some instances, the personalization system 106 may send the data to the registration system 112 on a per-card basis. In other instances, the personalization system 106 may send the data to the registration system 112 in a batch or bulk file. In embodiments, the registration system 112 may provide one or more APIs for the personalization system 106 to communicate the data to the registration system 112.

In embodiments, the registration system 112 is configured to enable other systems, such as the personalization system 106 to register contactless cards. The registration process may include sending data one or more other systems, such as system 116, to perform contactless card operations for the registered the cards. The registration system 112 may be configured to receive data from the personalization system 106 or another system to register, deregister, and provide the status of contactless cards. In embodiments, the registration system 112 may send system 116 including validation server 110 registration data to store in the validation security system 108. As discussed above, the validation security system 108 may also be an HSM configured to secure data, including registration data. The validation security system 108 may store the data in the same data schema as discussed above with the personalization security system 104.

In some instances, the registration system 112 provides endpoints for creating a new or replacement card and removing an active card. In one example, the creation endpoint accepts the Issuer ID, PUID, active as-of date, expired as-of date, and an optional field of the PUID it is replacing. If the replacement PUID field is set, the record referenced by that PUID must be active to prevent cheating by continually registering all new cards as replacements. Only after creating a replacement card can the original card be deactivated. The deactivation endpoint marks the record associated with the requested Issuer ID/PUID as inactive. Once a record is marked as inactive it cannot be reactivated.

In embodiments, the registration system 112 provides a third endpoint for querying information for an active card. The endpoint accepts Issuer ID/PUID to select the correct record and returns an active status to a querying computing device. The registration system 112 determines the active status based on one or more of the following criteria:

is the Deactivated field set to false;

is the current date after the Active As Of field; and/or is the current date before the Expired As Of field.

As discussed above, the registration system 112 may store data in the validation security system 108. One sample database schema includes:

(Issuer ID+PUID is the primary key);

Issuer ID;

PUID;

Active as-of;

Expired as-of; and

Deactivated Replaces PUID.

Below is Table 1 of example Endpoint data schema that may be provided by the registration system 112.

TABLE 1

| Endpoint | Required Data Fields | | Data Type | |
|---|---|---|---|---|
| Get Registered Card | | issuerId | | 6 character string |
| | | puid | | 16 character string |
| Register Card | | issuerId | | 6 character string |
| | card | puid | object | 16 character string |
| | | expiration date | | string with format yyyy-MM-dd |
| Unregister Cards | | issuerId | | 6 character string |
| | | cards | | array of 16 character strings (each of which represents a puid) |

As illustrated in Table 1, the "Get Registered Card" endpoint accepts the issuerID and the puid, and will return an indication whether a card is registered or not. The "Register Card" endpoint accepts the issuerID, the card puid, and the card expiration date, and will register the card with systems, such as system 116. The "Unregister Cards" endpoint accepts the issuerID and one or more card's puids in an array. In some instances, the unregistering may be some point in the future. In some embodiments, the "Unregister Cards" endpoint may also accept an unregister date. The unregister API can be called, but the un-registration will not take effect until some future date.

In embodiments, the registration system 112 provides updates to other systems, such as system 116 including the validation server 110 and the validation security system 108 for every change made. The registration system 112 may also send updates to one or more other systems. For example, the registration system 112 may send change events to an offline analytics datastore, such as a data lake, for proper analysis of the information for billing purposes. These change events may include registration of a new card (no replacement PUID set), registration of a replacement card (replacement PUID set), forced deactivation of a card with a replacement, and forced deactivation of a card with no replacement. These updates may be made via one or more messages to sent to the receiving computing device or through API communications.

In one embodiment, API examples may be potentially configured on the registration system 112. For example, an API describes a "card-registration-service," identified as version "0.0.1" and maintained by a billing system. Its core purpose is to manage the registration of cards, thereby enabling the billing of external partners based on these registrations. In this example configuration, the service communicates via HTTP, is hosted locally (localhost: 9999), uses the base path/, and produces responses formatted as application/json.

The API exposes several endpoints for interaction. Firstly, a simple GET request to /health (operation ID healthcheck) serves as a basic health monitor, returning a 200 OK response with {"ok": true} if healthy, or a 500 Internal Server Error with a defined cap1ErrorResponse schema if unhealthy. Secondly, to retrieve details of a single registered card, a GET request is made to /v1/{issuer}/registration/{puid} (operation ID GetRegisteredCard), requiring both the issuer and puid as mandatory string path parameters. A successful 200 OK response returns the card's data using the cardRegistrationResponse schema (detailing PUID, expiration, registration/unregistration dates, and issuer), signifying an active and unexpired registration. If the card isn't found, is inactive, or expired, a 404 Not Found is returned; server issues result in a 500 Internal Server Error, both using the cap1ErrorResponse schema.

Furthermore, the API supports bulk operations for registering and unregistering cards. A POST request to /v1/{issuerId}/register (operation ID register) allows registering multiple cards. This requires the issuerId (specified as a 6-character hex string) in the path and consumes an application/json request body (registerBody). This body must contain an object with a required cards array, where each element is a card's PUID (in UUID string format). A 200 OK response indicates all cards were registered successfully. A 202 Accepted response signifies partial success, meaning some registrations failed; the response body will detail these failures using the unsuccessfulRegistration schema. Invalid input triggers a 400 Bad Request, while server-side problems during processing lead to a 500 Internal Server Error, with error details provided via cap1ErrorResponse or potentially unsuccessfulRegistration schemas respectively.

Similarly, unregistering (soft deleting) multiple cards is achieved via a POST request to /v1/{issuerId}/unregister (operation ID unregister). It mirrors the registration endpoint's structure, requiring the issuerId (6-character hex string) in the path and a request body (unregisterBody) with a cards array of PUIDs (UUID strings). The response codes function identically: 200 OK for full success, 202 Accepted for partial success (with failures detailed in the unsuccessfulRegistration schema), 400 Bad Request (cap1ErrorResponse), and 500 Internal Server Error (potentially unsuccessfulRegistration).

Finally, the API defines specific data structures (definitions) for responses. The cap1ErrorResponse provides a standard error format with an internal id (integer) and a human-readable developerText (string). The unsuccessfulRegistration schema is used for bulk operations that result in partial failure, containing an errors array where each element links a specific failed puid (string UUID) to an error id and developerText. The cardRegistrationResponse structure defines the successful output for retrieving a card's details, including its puid, expiration date/time, lastRegistered date/time, lastUnregistered date/time, and the associated issuer.

In embodiments, the registration system 112 enables systems, such as the personalization system 106, to register new and replacement cards, and deregister cards. The registration system 112 also enables systems, such as merchant systems or other systems perform verifications, to perform status operations to determine the current status of contactless cards. The status may include whether a card is currently active, activation date, expiration date, etc.

In one example, a computing device, such as a mobile device or point-of-sale (POS) terminal, may send data via the "Get Registered Card" endpoint to the registration system 112 to determine the status of a contactless card and perform other operations, such as a transaction or authentication of the user. The registration system 112, performs a lookup for a card status based on the unique identifier, issuer identifier, or a combination of both. The registration system 112 may return the status of the card to the querying device, e.g., an indication of whether the card is active or inactive. In some instances, the registration system 112 may perform a status check during a transaction of when performing authentication. If the card is inactive, the registration system 112 may decline the transaction or send a failure to authenticate indication.

Figure 10:
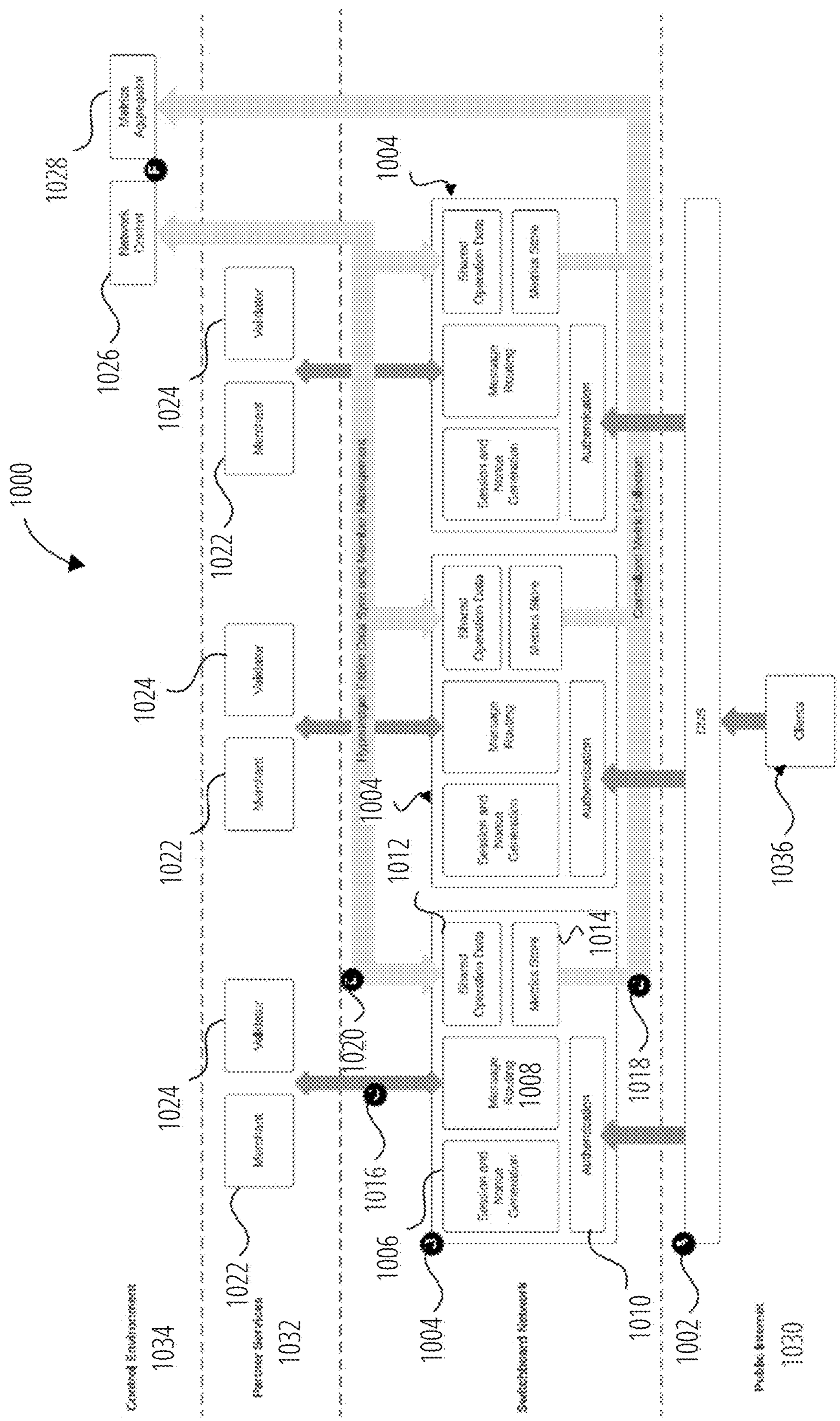
FIG. 10 illustrates an example of a system 1000 configured to operate in accordance with embodiments discussed herein.

In some instances, the registration system 112 may be part of a switchboard or routing system, as shown in FIG. 10, system 1000. In other instances, the registration system 112 may be a separate system and may communicate with systems, such as system 1000.

In embodiments, the personalization system 106 also sends data contactless cards at the time of manufacture. For example, the personalization system 106 may send card data to a card manufacture system to write to contactless cards. The card data may be provided for each card separately or in a bulk file. In some instances, the personalization system 106 writes data to the cards themselves. The card data may include one or more card master keys as discussed herein, the issuer identifier, the unique identifier, expiration date, card number, personal information (name), CVV, etc.

Figure 8:
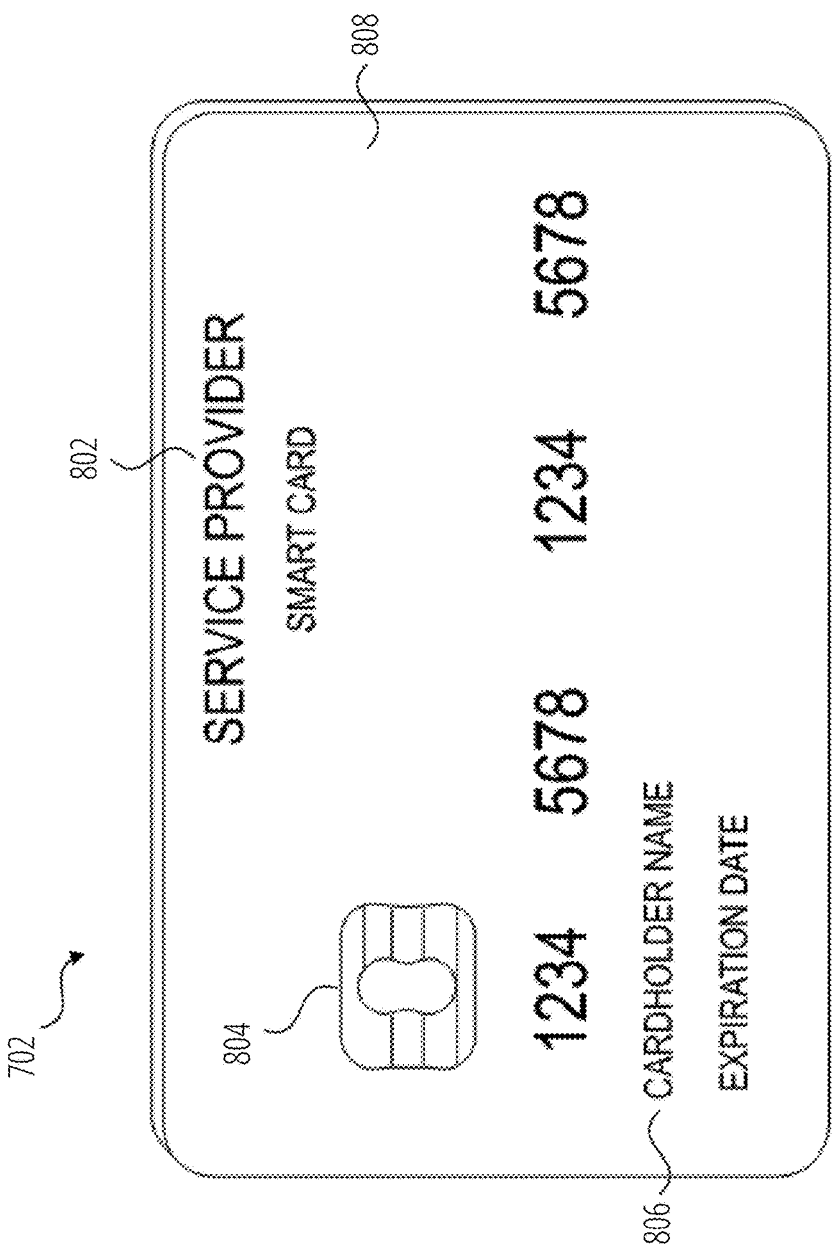
FIG. 8 illustrates a contactless card 702 in accordance with one embodiment.
Figure 9:
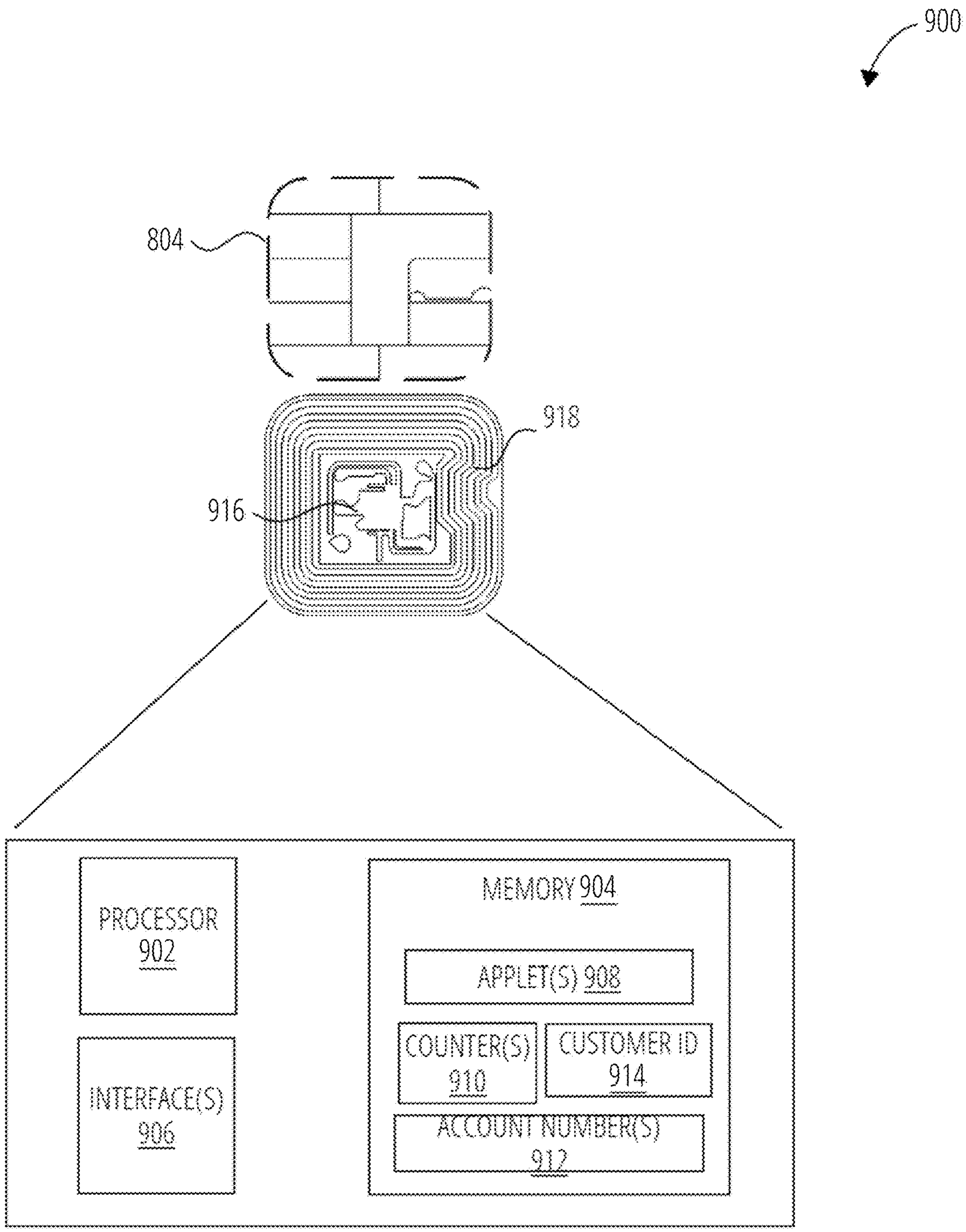
FIG. 9 illustrates a transaction card component 900 in accordance with one embodiment.

In embodiments, the contactless card 114 is configured at personalization time and then may be sent to a user to use. FIG. 8 and FIG. 9 discuss more detail with respect to the contactless card 114 and circuitry.

Figure 2A:
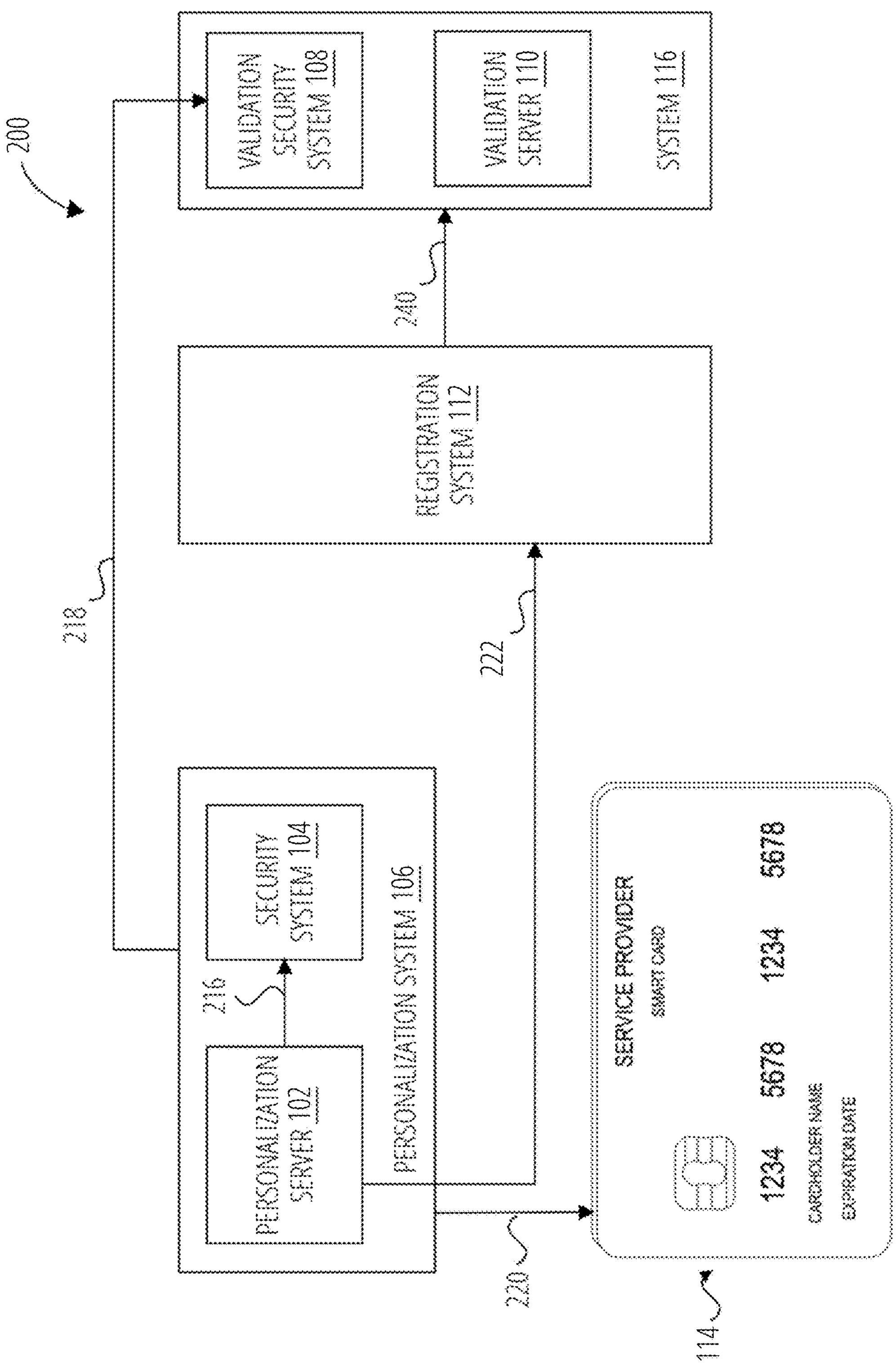
FIG. 2A illustrates an aspect of the subject matter in accordance with one embodiment.

FIG. 2A illustrates an example processing flow 200 that may be performed during a registration process in accordance with embodiments discussed herein. In embodiments, the personalization system 106 may receive instructions to generate a new or replacement card and card data. In embodiments, the personalization system 106 may generate card data such as card master keys, as discussed herein, and account information including an activation date, expiration date, and an indication if the contactless card 114 is a replacement card. The card's master keys may be based on an issuer identifier identifying an issuer of the card and a unique identifier identifying the card and user.

At 216, the personalization server 102 may generate and provide the card's master keys to the personalization security system 104, which may further exchange the card's master keys with the validation security system 108 at 218. In embodiments, the personalization security system 104 may communicate the keys to the validation security system 108 in one or more messages using a secure protocol or utilize one or more APIs provided by the system 116 and validation security system 108.

The personalization server 102 may also generate and communicate additional card data to the registration system 112 at 222. The data may include an activation date, an expiration date, an indication that the card is a replacement card, an issuer identifier, and a unique identifier. The personalization server 102 may send the additional data via one or more secure messages or utilize one or more APIs as discussed herein.

The registration system 112 may receive the data and perform one or more registration processes, e.g., register new/replacement cards or deregister cards. In some instances, at 240, the registration system 112 sends data to other systems, such as 116 including the validation server 110 and validation security system 108 to store and utilize registration information. For example, the validation server 110 may perform operations to determine whether a card is register or not during a validation request.

In embodiments, the personalization system 106 also communicates data to the contactless card 114 during personalization at 220. For example, the personalization system 106 may write the cards master keys (unique card keys) to the contactless card 114 along with the issuer identifier, the unique identifier, CVV, account number, user's name. The data may be utilized by the contactless card 114 to perform operations, such as transaction operations and authentication operations.

Figure 2B:
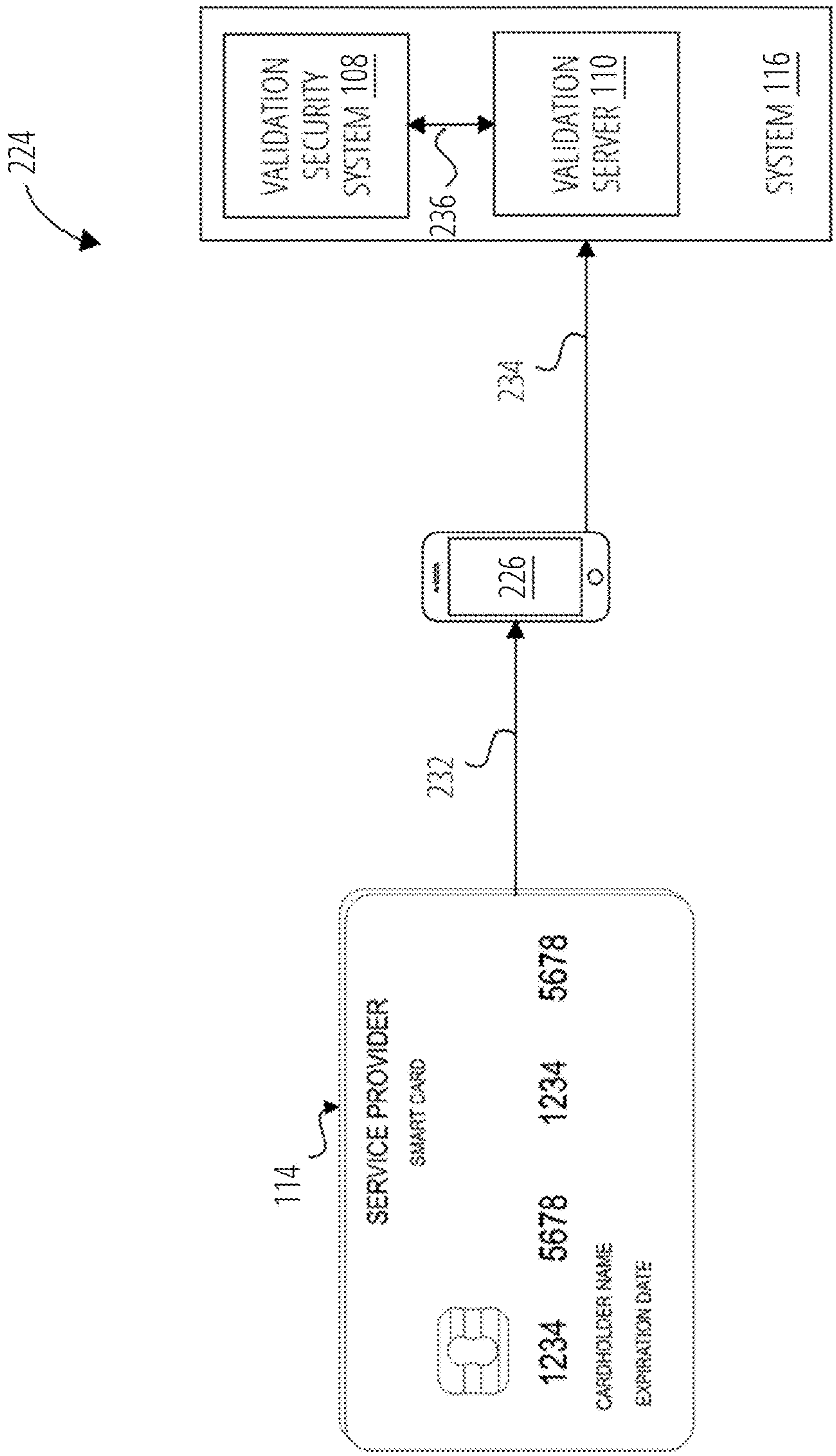
FIG. 2B illustrates an aspect of the subject matter in accordance with one embodiment.

FIG. 2B illustrates an example processing flow 224 that may be performed during an operation such as a transaction or authentication in accordance with embodiments. In one example, a user may utilize the computing device 226 to perform a transaction or authentication operation. At 232, the computing device 226 may perform a communication exchange with the contactless card 114 via wireless communication, such as utilizing near-field communication (NFC). The contactless card 114 may send encrypted data to the computing device 226, and the computing device 226 may send the encrypted data to the validation system 112 to perform a transaction or authentication operation. In one example, the encrypted data may be communicated in a cryptogram as illustrated and discussed with respect to FIG. 13.

At 234, the computing device 226 may send the encrypted data to the system 116 to perform a transaction or authentication. In some instances, the computing device 226 sends the encrypted to the system 116 through a network as illustrated and discussed in FIG. 10. For example, the system 1000 may receive encrypted data from the computing device 226 and routes the data to the correct validation server 110 based on the issuer identifier as discussed in FIG. 10.

In embodiments, the validation server 110 may authenticate the encrypted data. Additionally, the validation server 110 may determine that the contactless card 114 is still registered and active. In one example, the validation server 110 may determine the card is active based on the issuer identifier and the unique identifier provided with the encrypted data. Specifically, the validation server 110 may perform a lookup in the validation security system 108 with the issuer identifier and the unique identifier to determine the active status of the card. If the card is active and the encrypted data is authenticated, the user may perform a transaction or other operation based on the authentication. In some instances, the validation server 110 may utilize the "Get Register ed Card" endpoint and communicate with the registration system 112 to determine the status of a contactless card.

In certain scenarios, a system can leverage the registration system 112 to ascertain the status of a contactless card without initiating another operation. For example, the computing device 226 can send a specific message or request to the registration system 112, seeking the status of a contactless card 114. This request typically includes the issuer identifier and the unique identifier. Upon receiving this request, the registration system 112 performs a lookup using the issuer identifier and the unique identifier, and then promptly returns the status. In some instances, the registration system 112 may provide an API, as discussed herein, and the computing device 226 may make an API call to determine the status of the contactless card 114. Embodiments are not limited in this manner.

Figure 3:
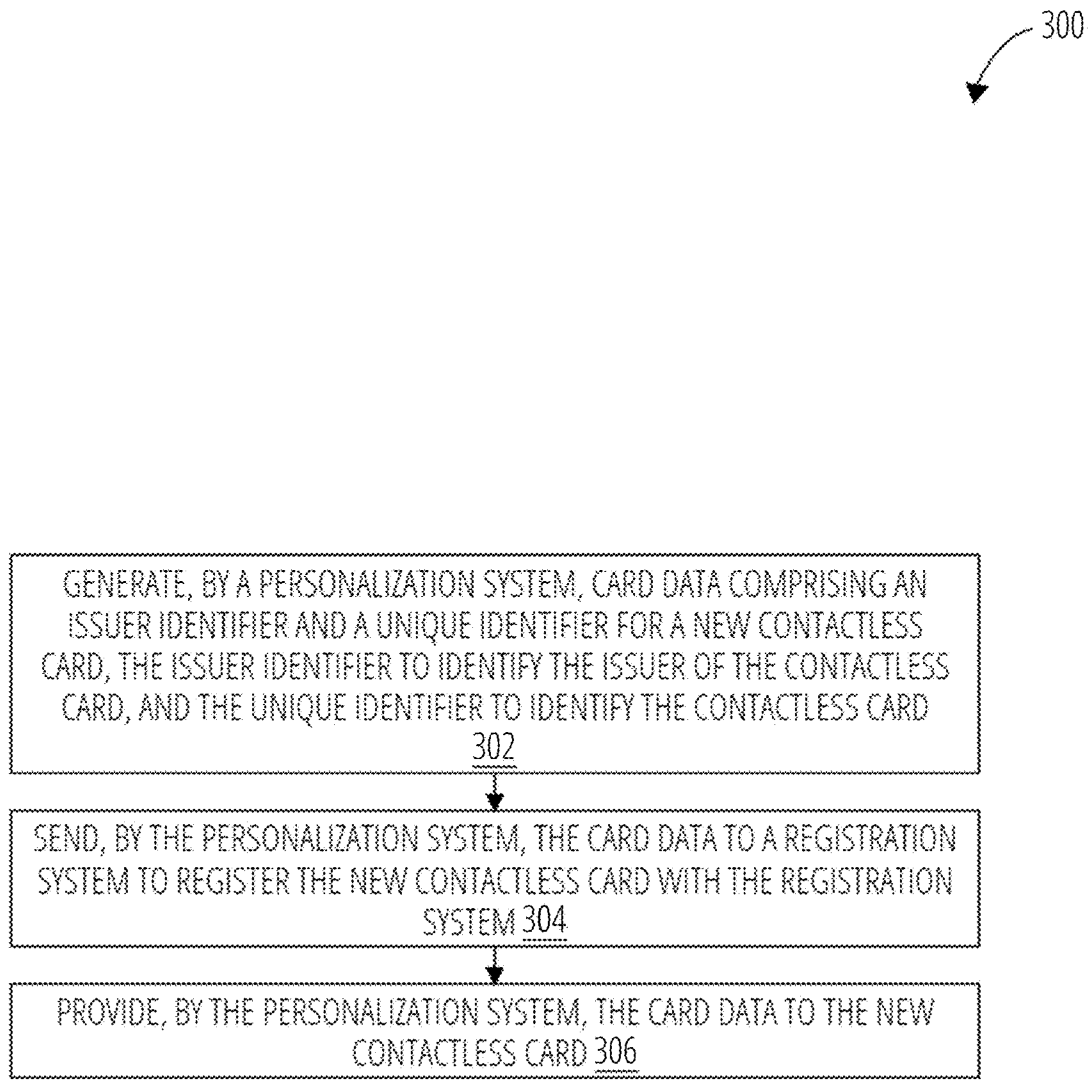
FIG. 3 illustrates a routine 300 in accordance with one embodiment.

FIG. 3 illustrates an example routine 300 that may be performed in accordance with embodiments to generate and register a new contactless card. One or more of the operations may be performed by a personalization system and the registration system in accordance with embodiments. In block 302, routine 300 generates card data comprising an issuer identifier and a unique identifier for a new contactless card, the issuer identifier to identify the issuer of the contactless card, and the unique identifier to identify the contactless card. The card data may include additional data, such as the activation date, the deactivation date, user information, one or more keys, and so forth.

In block 304, routine 300 sends at least a portion of the card data to a registration system to register the new contactless card with the registration system. In one example, the personalization system sends the issuer identifier, the unique identifier, and the expiration date to the registration system 112 in a secure communication and/or API call.

In block 306, routine 300 provides the card data to the new contactless card. For example, the personalization system may write at least a portion of the card data to the write during a card manufacturing process and embodiments are not limited in this manner.

Figure 4:
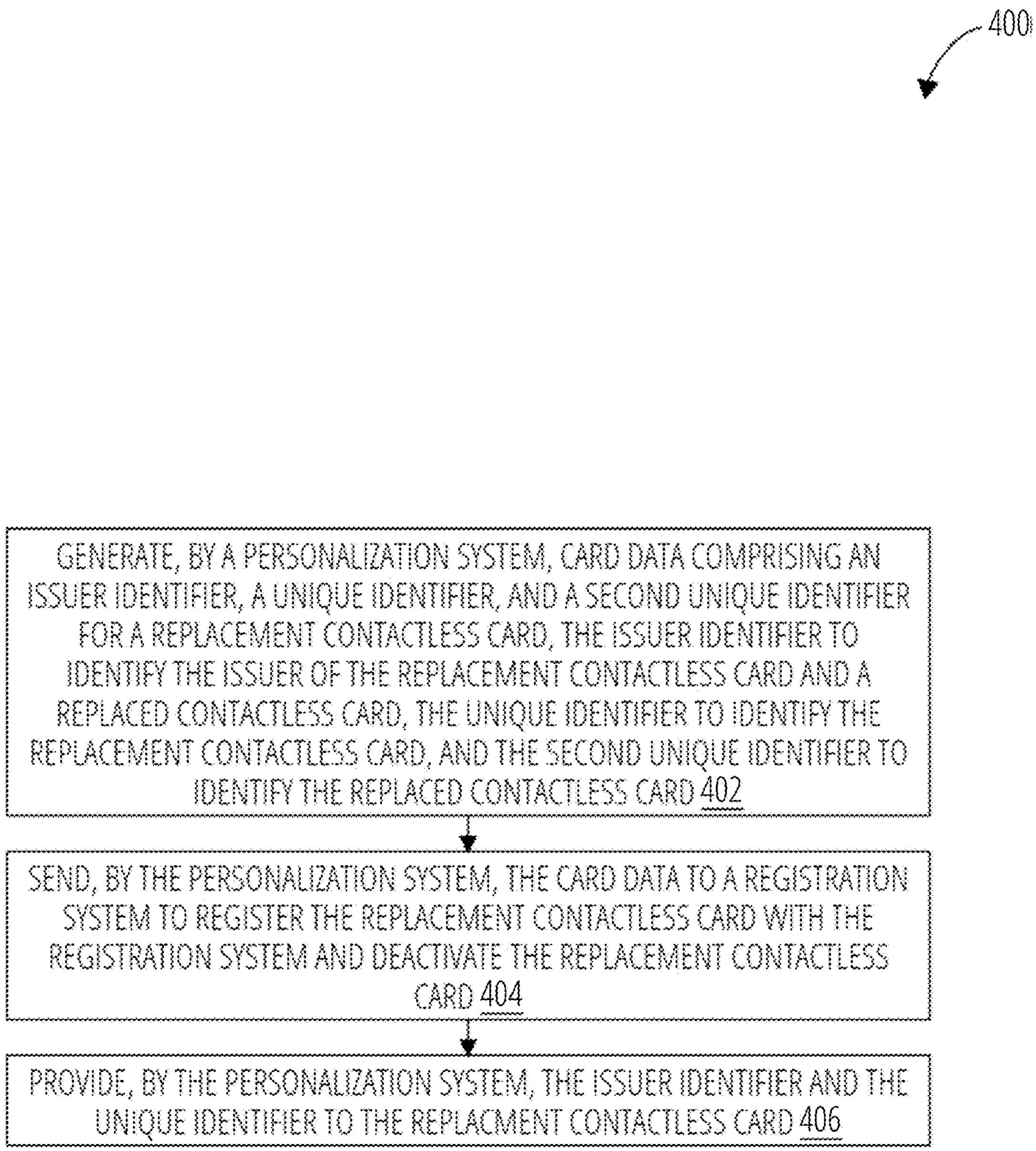
FIG. 4 illustrates a routine 400 in accordance with one embodiment.

FIG. 4 illustrates an example routine 400 that may be performed to issue a replacement contactless card in accordance with embodiments. One or more operations discussed herein may be performed by a personalization system and registration system. In block 402, routine 400 generates card data comprising an issuer identifier, a unique identifier, and a second unique identifier for a replacement contactless card. Further, the issuer identifier identifies the issuer of the replacement contactless card and a replaced contactless card, the unique identifier identifies the replacement contactless card, and the second unique identifier identifies the replaced contactless card.

In block 404, routine 400 sends the card data to a registration system to register the replacement contactless card with the registration system and deactivate the replacement contactless card. The personalization system may send one or more messages or utilize an API to register the replacement card.

In block 406, routine 400 provides the issuer identifier and the unique identifier to the replacement contactless card, e.g., writes the information to the new contactless card.

Figure 5:
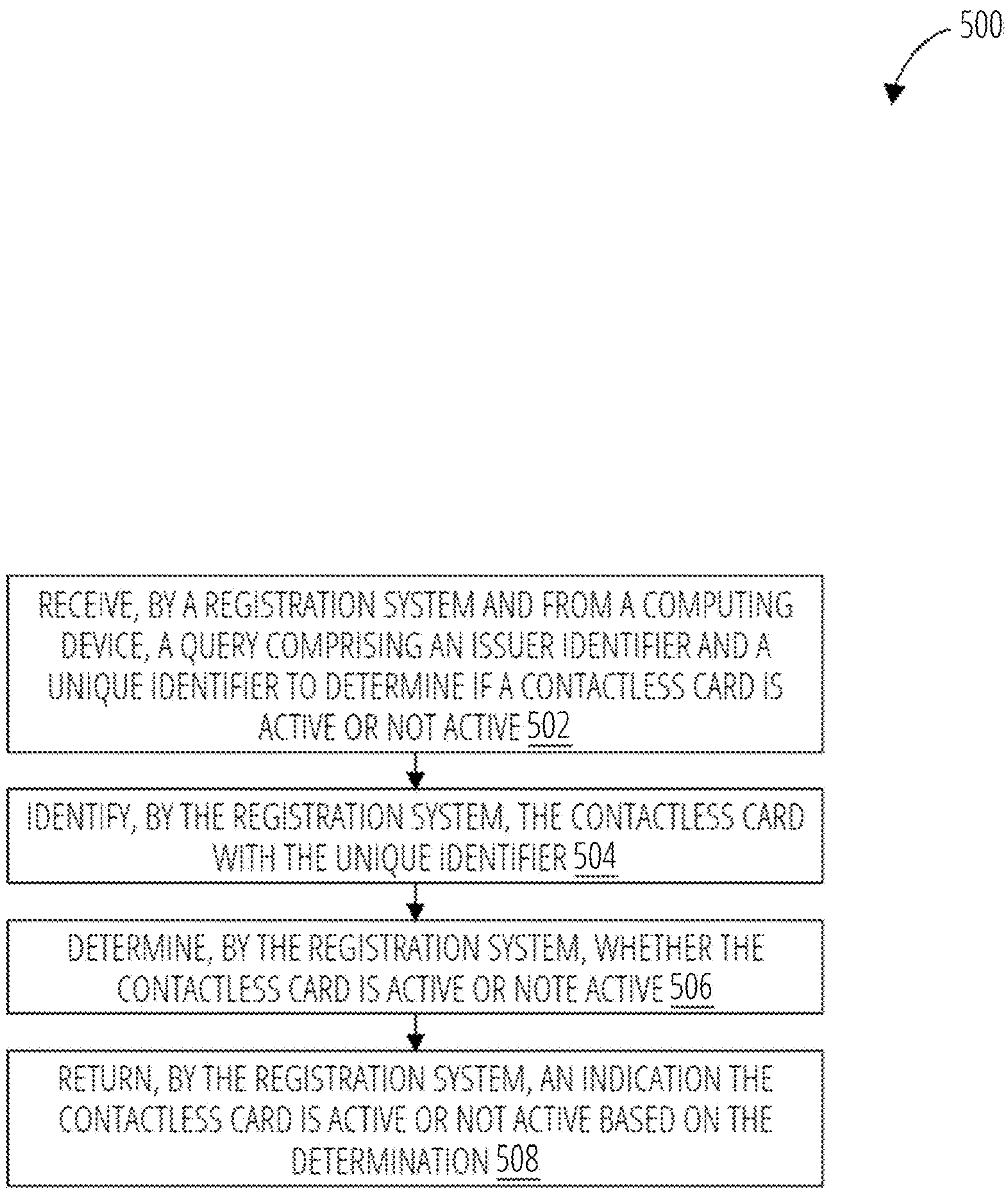
FIG. 5 illustrates a routine 500 in accordance with one embodiment.

FIG. 5 illustrates an example routine 500 that may be performed to determine the status of a contactless card. One or more of the operations may be performed by a registration system. In block 502, routine 500 receives, by a registration system and from a computing device, a query comprising an issuer identifier and a unique identifier to determine if a contactless card is active or not active. In block 504, routine 500 identifies, by the registration system, the contactless card with a unique identifier. In block 506, routine 500 determines, by the registration system, whether the contactless card is active or not active. In block 508, routine 500 returns an indication that the contactless card is active or inactive based on the determination.

Figure 6:
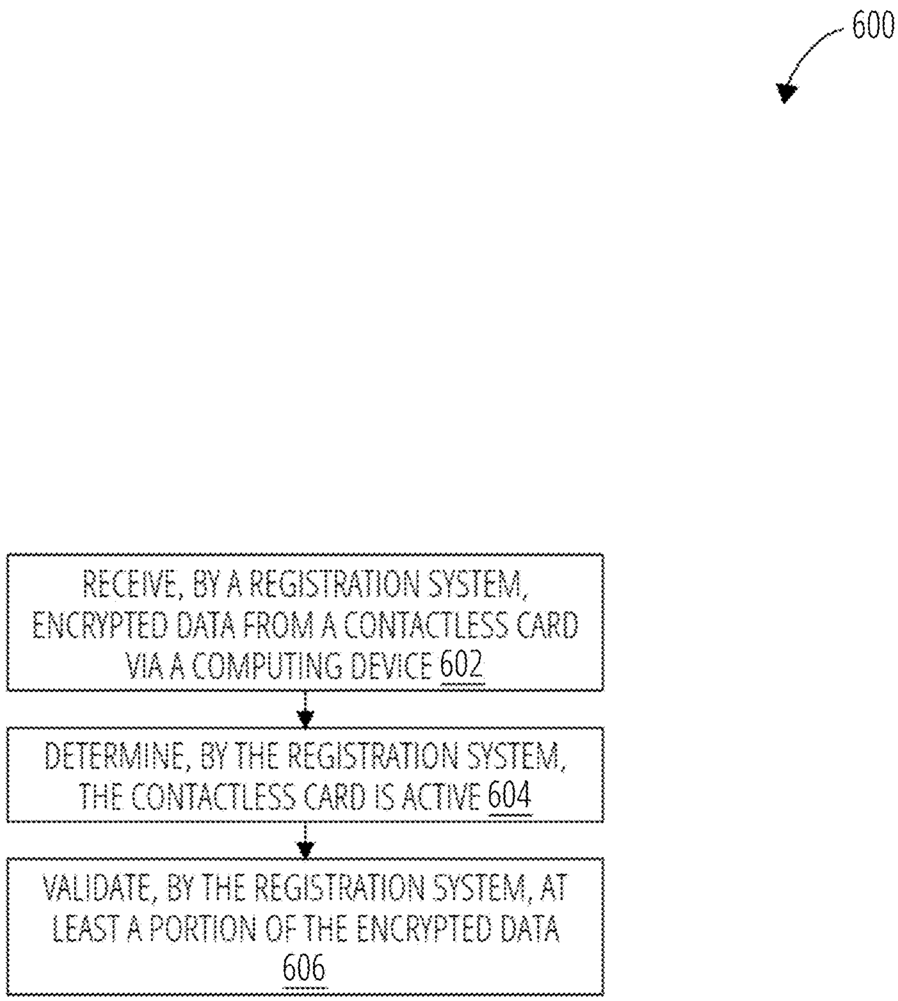
FIG. 6 illustrates a routine 600 in accordance with one embodiment.

FIG. 6 illustrates an example routine 600 to perform an authentication operation in accordance with the embodiments discussed herein. One or more of the operations may be performed by a validation system including a validation server 110. In block 602, routine 600 receives encrypted data from a contactless card via a computing device. In block 604, routine 600 determines the contactless card is active, e.g., via a registration system or by performing a lookup "locally" on the validation security system 108. In block 606, routine 600 validates at least a portion of the encrypted data, e.g., the unique identifier matches a stored value, a counter value is within range of a stored counter value, a nonce value matches a provided nonce value, and so forth as discussed herein.

Figure 7:
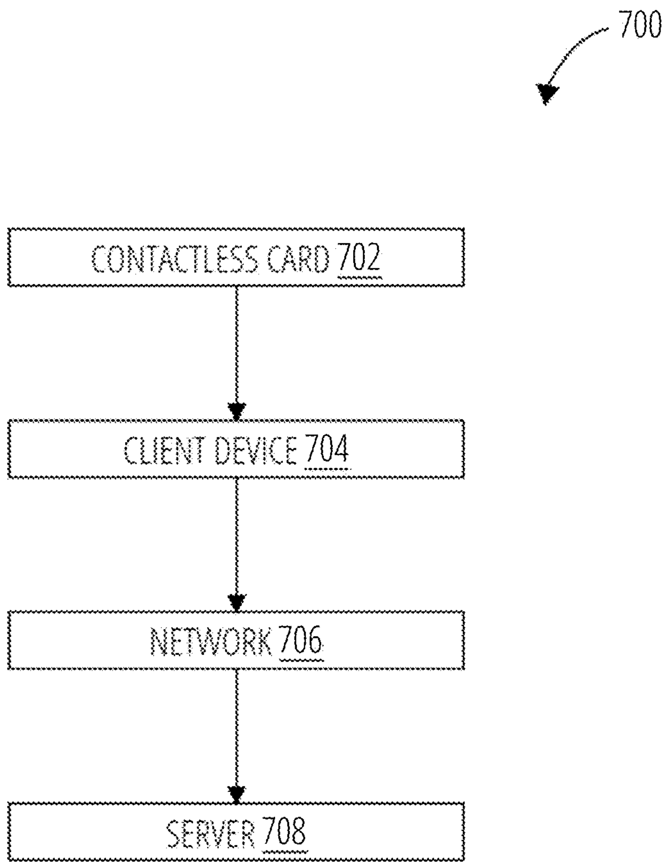
FIG. 7 illustrates an aspect of the subject matter in accordance with one embodiment.

FIG. 7 illustrates a data transmission system 700 according to an example embodiment. As further discussed below, system 700 may include contactless card 702, client device 704, network 706, and server 708. Although FIG. 7 illustrates single instances of the components, system 700 may include any number of components.

System 700 may include one or more contactless cards 702, which are further explained below. In some embodiments, contactless card 702 may be in wireless communication, utilizing NFC in an example, with client device 704.

System 700 may include client device 704, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 704 device can include a processor and a memory, and it is understood that the processing circuitry may contain additional components, including processors, memories, error and parity/CRC checkers, data encoders, anticollision algorithms, controllers, command decoders, security primitives and tamper proofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 704 of system 700 may execute one or more applications, such as software applications, that enable, for example, network communications with one or more components of system 700 and transmit and/or receive data.

The client device 704 may be in communication with one or more server(s) 708 via one or more network(s) 706, and may operate as a respective front-end to back-end pair with server 708. The client device 704 may transmit, for example from a mobile device application executing on client device 704, one or more requests to server 708. The one or more requests may be associated with retrieving data from server 708. The server 708 may receive the one or more requests from client device 704. Based on the one or more requests from client device 704, server 708 may be configured to retrieve the requested data from one or more databases (not shown). Based on receipt of the requested data from the one or more databases, server 708 may be configured to transmit the received data to client device 704, the received data being responsive to one or more requests.

System 700 may include one or more networks 706. In some examples, network 706 may be one or more of a wireless network, a wired network or any combination of wireless network and wired network, and may be configured to connect client device 704 to server 708. For example, network 706 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, network 706 may include, without limitation, telephone lines, fiber optics, IEEE Ethernet 802.3, a wide area network, a wireless personal area network, a LAN, or a global network such as the Internet. In addition, network 706 may support an Internet network, a wireless communication network, a cellular network, or the like, or any combination thereof. network 706 may further include one network, or any number of the exemplary types of networks mentioned above, operating as a stand-alone network or in cooperation with each other. network 706 may utilize one or more protocols of one or more network elements to which they are communicatively coupled. network 706 may translate to or from other protocols to one or more protocols of network devices. Although network 706 is depicted as a single network, it should be appreciated that according to one or more examples, network 706 may comprise a plurality of interconnected networks, such as, for example, the Internet, a service provider's network, a cable television network, corporate networks, such as credit card association networks, and home networks.

System 700 may include one or more servers 708. In some examples, server 708 may include one or more processors, which are coupled to memory. The server 708 may be configured as a central system, server or platform to control and call various data at different times to execute a plurality of workflow actions. Server 120 may be configured to connect to the one or more databases. The server 708 may be connected to at least one client device 704.

FIG. 8 illustrates an example configuration of a contactless card 702, which may include a contactless card, a payment card, such as a credit card, debit card, or gift card, issued by a service provider as displayed as service provider indicia 802 on the front or back of the contactless card 702. In some examples, the contactless card 702 is not related to a payment card, and may include, without limitation, an identification card. In some examples, the transaction card may include a dual interface contactless payment card, a rewards card, and so forth. The contactless card 702 may include a substrate 808, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 702 may have physical characteristics compliant with the ID-1 format of the ISO/IEC 7816 standard, and the transaction card may otherwise be compliant with the ISO/IEC 14443 standard. However, it is understood that the contactless card 702 according to the present disclosure may have different characteristics, and the present disclosure does not require a transaction card to be implemented in a payment card.

The contactless card 702 may also include identification information 806 displayed on the front and/or back of the card, and a contact pad 804. The contact pad 804 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 702 may also include processing circuitry, antenna and other components as will be further discussed in FIG. 9. These components may be located behind the contact pad 804 or elsewhere on the substrate 808, e.g. within a different layer of the substrate 808, and may electrically and physically coupled with the contact pad 804. The contactless card 702 may also include a magnetic strip or tape, which may be located on the back of the card (not shown in FIG. 8). The contactless card 702 may also include a Near-Field Communication (NFC) device coupled with an antenna capable of communicating via the NFC protocol. Embodiments are not limited in this manner.

As illustrated in 2, the contact pad 804 of contactless card 702 may include processing circuitry 916 for storing, processing, and communicating information, including a processor 902, a memory 904, and one or more interface(s) 906. It is understood that the processing circuitry 916 may contain additional components, including processors, memories, error and parity/CRC checkers, data encoders, anticollision algorithms, controllers, command decoders, security primitives and tamper proofing hardware, as necessary to perform the functions described herein.

The memory 904 may be a read-only memory, write-once read-multiple memory or read/write memory, e.g., RAM, ROM, and EEPROM, and the contactless card 702 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 904 may be encrypted memory utilizing an encryption algorithm executed by the processor 902 to encrypted data.

The memory 904 may be configured to store one or more applet(s) 908, one or more counter(s) 910, a customer identifier 914, and the account number(s) 912, which may be virtual account numbers. The one or more applet(s) 908 may comprise one or more software applications configured to execute on one or more contactless cards, such as a Java® Card applet. However, it is understood that applet(s) 908 are not limited to Java Card applets, and instead may be any software application operable on contactless cards or other devices having limited memory. The one or more counter(s) 910 may comprise a numeric counter sufficient to store an integer. The customer identifier 914 may comprise a unique alphanumeric identifier assigned to a user of the contactless card 702, and the identifier may distinguish the user of the contactless card from other contactless card users. In some examples, the customer identifier 914 may identify both a customer and an account assigned to that customer and may further identify the contactless card 702 associated with the customer's account. As stated, the account number(s) 912 may include thousands of one-time use virtual account numbers associated with the contactless card 702. An applet(s) 908 of the contactless card 702 may be configured to manage the account number(s) 912 (e.g., to select an account number(s) 912, mark the selected account number(s) 912 as used, and transmit the account number(s) 912 to a mobile device for auto filling by an autofilling service.

The processor 902 and memory elements of the foregoing exemplary embodiments are described with reference to the contact pad 804, but the present disclosure is not limited thereto. It is understood that these elements may be implemented outside of the contact pad 804 or entirely separate from it, or as further elements in addition to processor 902 and memory 904 elements located within the contact pad 804.

In some examples, the contactless card 702 may comprise one or more antenna(s) 918. The one or more antenna(s) 918 may be placed within the contactless card 702 and around the processing circuitry 916 of the contact pad 804. For example, the one or more antenna(s) 918 may be integral with the processing circuitry 916 and the one or more antenna(s) 918 may be used with an external booster coil. As another example, the one or more antenna(s) 918 may be external to the contact pad 804 and the processing circuitry 916.

In an embodiment, the coil of contactless card 702 may act as the secondary of an air core transformer. The terminal may communicate with the contactless card 702 by cutting power or amplitude modulation. The contactless card 101 may infer the data transmitted from the terminal using the gaps in the contactless card's power connection, which may be functionally maintained through one or more capacitors. The contactless card 702 may communicate back by switching a load on the contactless card's coil or load modulation. Load modulation may be detected in the terminal's coil through interference. More generally, using the antenna(s) 918, processor 902, and/or the memory 904, the contactless card 101 provides a communications interface to communicate via NFC, Bluetooth, and/or Wi-Fi communications.

As explained above, contactless card 702 may be built on a software platform operable on smart cards or other devices having limited memory, such as JavaCard, and one or more or more applications or applets may be securely executed. Applet(s) 908 may be added to contactless cards to provide a one-time password (OTP) for multifactor authentication (MFA) in various mobile application-based use cases. Applet(s) 908 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 908 may be configured to encode the OTP as an NDEF type 4 well known type text tag. In some examples, NDEF messages may comprise one or more records. The applet(s) 908 may be configured to add one or more static tag records in addition to the OTP record.

In some examples, the one or more applet(s) 908 may be configured to emulate an RFID tag. The RFID tag may include one or more polymorphic tags. In some examples, each time the tag is read, different cryptographic data is presented that may indicate the authenticity of the contactless card. Based on the one or more applet(s) 908, an NFC read of the tag may be processed, the data may be transmitted to a server, such as a server of a banking system, and the data may be validated at the server.

In some examples, the contactless card 702 and server may include certain data such that the card may be properly identified. The contactless card 702 may include one or more unique identifiers (not pictured). Each time a read operation takes place, the counter(s) 910 may be configured to increment. In some examples, each time data from the contactless card 702 is read (e.g., by a mobile device), the counter(s) 910 is transmitted to the server for validation and determines whether the counter(s) 910 are equal (as part of the validation) to a counter of the server.

The one or more counter(s) 910 may be configured to prevent a replay attack. For example, if a cryptogram has been obtained and replayed, that cryptogram is immediately rejected if the counter(s) 910 has been read or used or otherwise passed over. If the counter(s) 910 has not been used, it may be replayed. In some examples, the counter that is incremented on the card is different from the counter that is incremented for transactions. The contactless card 101 is unable to determine the application transaction counter(s) 910 since there is no communication between applet(s) 908 on the contactless card 702.

In some examples, the counter(s) 910 may get out of sync. In some examples, to account for accidental reads that initiate transactions, such as reading at an angle, the counter(s) 910 may increment but the application does not process the counter(s) 910. In some examples, when the mobile device 10 is woken up, NFC may be enabled and the device 110 may be configured to read available tags, but no action is taken responsive to the reads.

To keep the counter(s) 910 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 910 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 910 increases in the appropriate sequence, then it possible to know that the user has done so.

The key diversification technique described herein with reference to the counter(s) 910, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 702, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 702. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

FIG. 10 illustrates an example of system 1000 in accordance with the embodiments discussed herein. The system 1000 includes additional devices and systems configured to enable contactless card issuers to tap-to-card services. Specifically, system 1000 enables any number of issuer systems to provide card services to their clients through a switching fabric, i.e., the switchboard system in a secure and safe manner.

In embodiments, the switchboard system includes one or more nodes 1004 configured to perform routing operations. Each switchboard node 1004 may include a session and nonce generator 1006, a message router 1008, an authentication 1010, an operation data 1012 store, and a metrics store 1014. Further, each of the nodes may be configured the same and share configurations, but each switchboard node 1004 may independently process and route messages and requests to the appropriate systems, such as the merchant systems and issuer systems. Each of the nodes 1004 is configured to act as a broker of trust between an issuer system, the merchant system 1022, and/or registration system 1024, for example. Each switchboard node 1004 is configured to route each message to the correct issuer system while maintaining data security. For example, a switchboard node 1004 may route a message between an issuer system and a merchant system while the node cannot access the private data in the message.

The switchboard system may be configured as a server system with a collection of hardware, software, and networking components that work together to provide client services. Hardware components may include one or more server computers, storage devices, and network adapters. The server computers are configured to run server applications, such as those executable on each of the nodes 1004. In some instances, each of the server computers may be configured to operate one or more nodes, e.g., in a virtual environment. The storage devices are configured to store data that is accessed by the applications, and the network adapters are used to connect the server computer to the network.

Each of the server computers may be configured to execute software, including the operating system, the applications, and security software. The networking components of a server system include the network switch, router, and firewall. The network switch is used to connect the server computers to other devices on the network. The router is used to route traffic between different networks. The firewall is used to protect the server system from unauthorized access and attacks.

Figure 11:
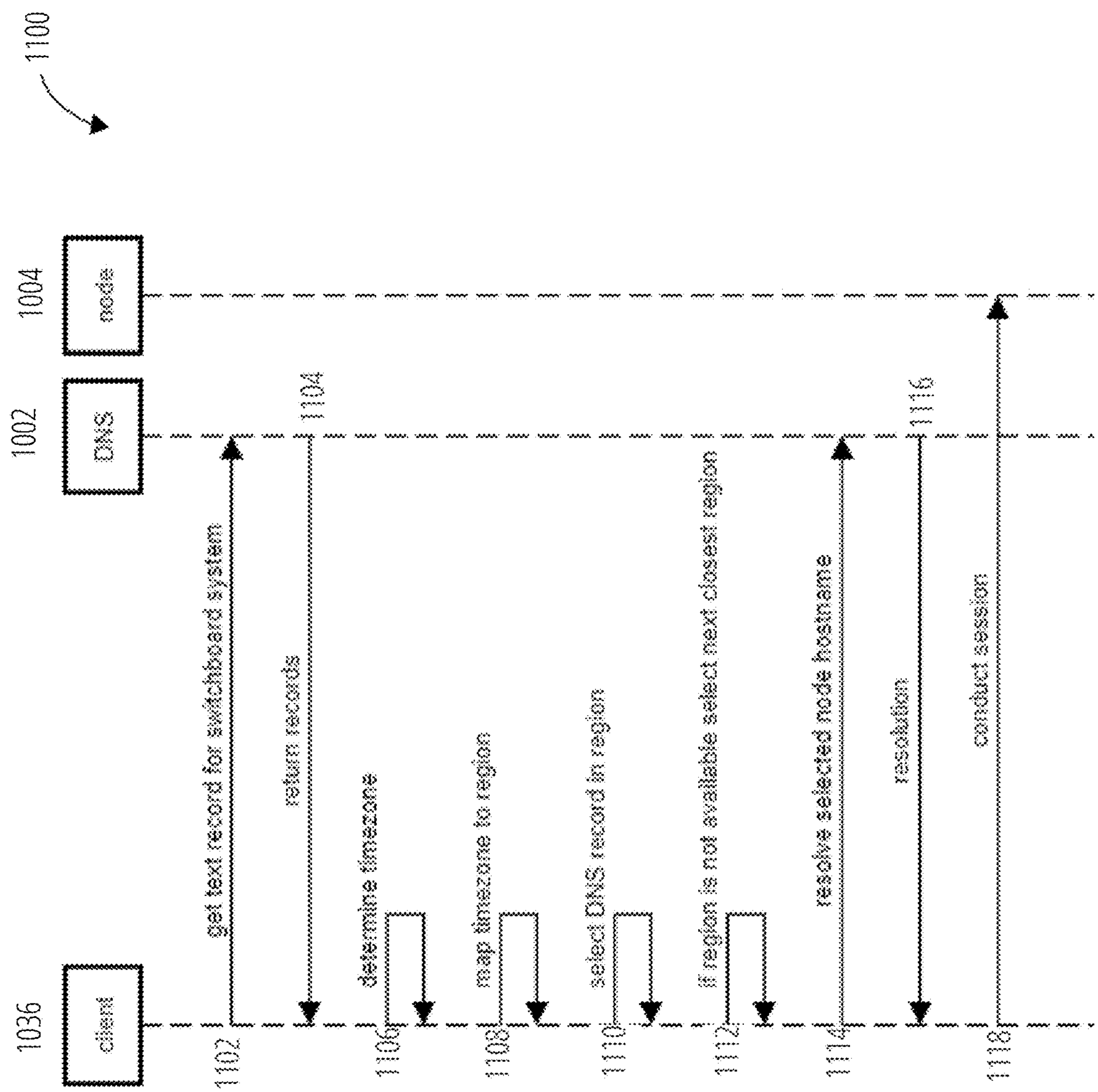
FIG. 11 illustrates an aspect of the subject matter in accordance with one embodiment.

In some embodiments, the nodes 1004 may operate in a cloud-based computing environment, e.g., a collection of hardware, software, and networking components that enable the delivery of cloud computing services. The switchboard nodes 1004 and the computing services are delivered over the Internet and can be accessed from anywhere in the world with an Internet connection. In embodiments, client 1036 may access a switchboard node 1004 through Domain Name System 1002 or Domain Name System (DNS). The DNS 1002 is a hierarchical and distributed naming system for computers, services, and other resources connected to the Internet or other networks. It associates various information with domain names assigned to each registered participant. In one example, the DNS 1002 may translate a name known to software executing on a client 1036 to route data to one or more of switchboard node 1004 of the switchboard system. In embodiments, the DNS 1002 may generate a number, such as an Internet Protocol (IP) address, an address record (A-record), or another Hostname (C-name record). FIG. 11 illustrates one example sequence 1100 for a client to identify and resolve an identifier for one of the nodes 1004 of the switchboard system. At a high level, the Domain Name System 1002 translates known domain names to numerical Internet Protocol (IP) addresses needed for locating and identifying computer services and devices with the underlying network protocols. Clients use the global DNS system to select the best node to use, as discussed in sequence 1100.

In embodiments, a client 1036 communicates with the switchboard system to perform one or more of the partner services 1032, such as conducting a transaction with a merchant, validating the customer, or other tap-to functions. Once client 1036 identifies a switchboard node 1004 and resolves an address to communicate with switchboard node 1004, client 1036 may send one or more messages to switchboard node 1004 to authenticate and perform the operation. The switchboard node 1004 includes an authentication 1010 function that is configured to authenticate the client 1036. In embodiments, the client 1036 sends a message or authorization request to the switchboard node 1004 with the following header set:

X-Sb-Api-Key: <CLIENT API KEY>

X-Sb-Dvc-Fngrprnt: Device-specific device fingerprint

The CLIENT API KEY may have the following example structure: 65535-GReyx5BuEAaE72bWbFZJfHRL8Dbt1Uum, where table 1 describes the value, name, and meaning:

TABLE 1

| Value | Name | Meaning |
|---|---|---|
| 65535 | Client ID | Individual identifier of client |

TABLE 1-continued

| Value | Name | Meaning |
|---|---|---|
| GReyx5BuEAnE72bWbFZJfHRL8Dbt1Uum | Client Key | Randomly assigned key |

The switchboard node 1004 may authorize or authenticate the client 1036 or user, and the switchboard node 1004 may utilize the additional components, such as the session and nonce generator 206 and message router 208, to perform the operations. Note the Validators validation systems 224 never interact with the merchant systems 222, nor vice versa. The nodes 204 brokers all communication.

In embodiments, the switchboard system may utilize a hyper ledger fabric 1020 to manage to synchronize the shared operation data 1012 and member management across the network. The hyperledger fabric 1020 is distributed ledger framework having a permissioned network model that only authorized participants can join the network and access the data that is stored on a ledger.

In embodiments, the hyperledger fabric 1020 may be generated by creating one or more sets of peers, an ordering service, and a channel. Once the network is created, system 1000 deploys chaincode to the network, or node 1004 is permitted to access the fabric. The chaincode is the code that runs on the blockchain and executes the network control 1026 and operation data 1012 logic code. Once the chaincode is deployed, each of the switchboard nodes 1004 is configured to invoke transactions on the blockchain to add data to the blockchain, e.g., the operational data. A switchboard node 1004 or another device can query the ledger to retrieve data. The ledger is a distributed database that stores all the data added to the blockchain.

All nodes 1004 keep an independently verifiable log of their actions that can be transmitted to a centralized aggregator to build a picture of overall network usage. System 1000 can manage network operation data and management at a central level and have a centralized view of network use, aggregated and abstracted to the appropriate level.

FIG. 11 illustrates an example sequence 1100 for a client to utilize DNS to resolve and communicate with one or more nodes of a switchboard system. The illustrated sequence 1100 includes a client 1036, a DNS 1002, and a switchboard node 1004. At 1102, the sequence 1102 includes the client 1036 sending a request to a default DNS server for a text record switchboard. {domain}. {tld}. The text record may be preconfigured in a client app and/or client sdk. At 1104, the DNS 1002 returns one or more records. A DNS record structure may include the following:

Root Record:

Name: switchboard.{domain}.{tld}

Type: TXT

Resolution:

{nodename_1}.{operator_a}.{region_i}.switchboard.{domain}.{tld},

{nodename_2}.{operator_a}.{region_i}.switchboard.{domain}.{tld},

{nodename_1}.{operator_b}.{region_ii}.switchboard.{domain}.{tld},

{nodename_2}.{operator_b}.{region_ii}.switchboard.{domain}.{tld},

* etc.

Used For determining where there are active nodes

Node Record:

Name:

{nodename}.{operator}.{region}.switchboard.{domain}.{tld}

Type: A/AAAA or CNAME

Resolution: Actual node hostname or IP

Used For: communicating with a node 1004

In embodiments, the client 1036 may determine the current time zone at 1106. For example, the client app or sdk may utilize a get current time zone function, such as in JavaScript: Intl.DateTimeFormat( ).resolvedOptions( ).timeZone). Embodiments are not limited in this manner, and the app or sdk may determine the timezone via another/different function call. At 1108, the client 1036 is configured to map the timezone to a region or short-version identifier of the region. One example includes America/New_York→na-e. The region may be based on DNS names, for example. Table 2 illustrates a few examples of timezone mappings to regions:

TABLE 2

| Timezone | Region | Short Version |
|---|---|---|
| America/New__York | North America/East | na-e |
| America/Buenos__Aires | South America | sa |
| US/Pacific | North America/West | na-w |
| Europe/Paris | Europe | en |

Embodiments are not limited to these examples, and other timezone-to-region mappings may be utilized. Further and in embodiments, Regions can also be represented as a bidirectional graph structure with the edges representing geographic neighbors. For example, na-e<->na-w and sa<->na-w and sa<->na-e. This representation is useful for node selection.

At 1110, the client may identify or select a DNS record option returned at 1104 that is in the region. If there are multiple matches, the client may select one at random. If there's no node available in a region, the client may determine and use a data graph of neighboring regions to select a node in the closest region where a node is available at 1112. For example, sa has no node but is connected to na-e where there is a node and so na-e is selected. In some embodiments, At 1114, the client may resolve a selected node's hostname. In embodiments, the client 1036 may automatically resolve the hostname using the client's HTTP request default resolver. At 1116, the Domain Name System 1002 may return a result. And at 1118, the client 1036 may communicate with a switchboard node 1004 and begin the process to interact with the switchboard.

Figure 12A:
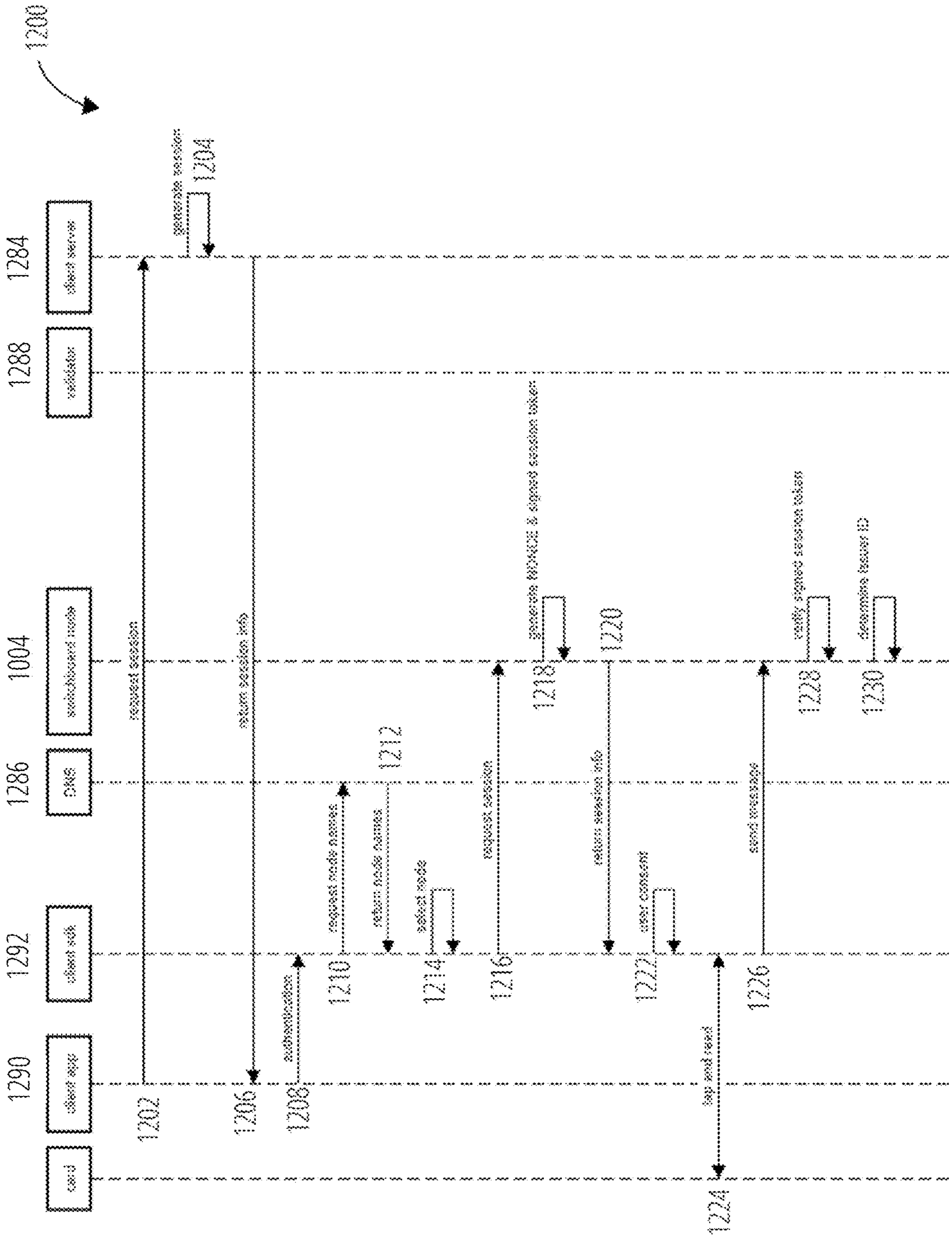
FIG. 12A illustrates an aspect of the subject matter in accordance with one embodiment.
Figure 12B:
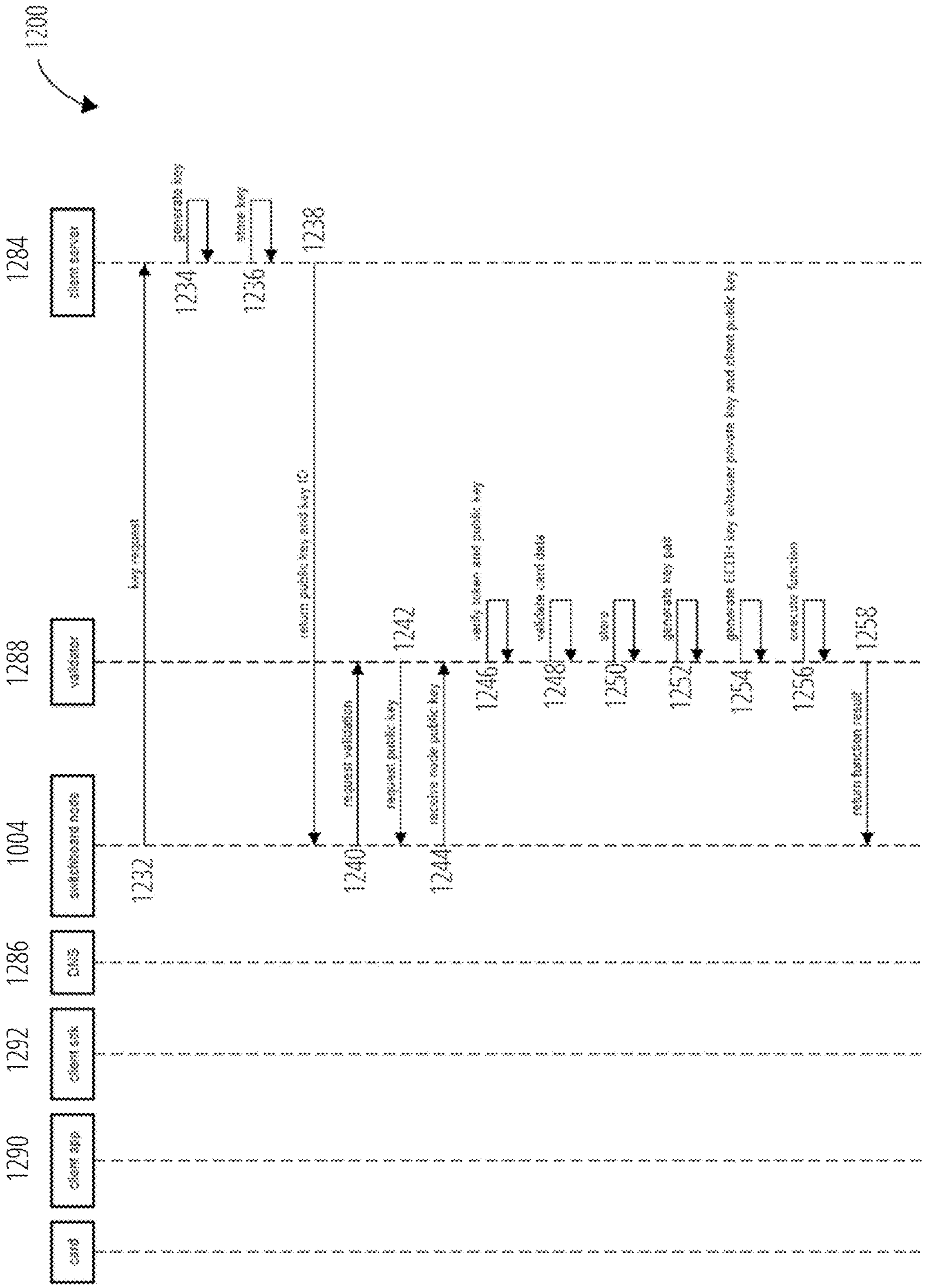
FIG. 12B illustrates an aspect of the subject matter in accordance with one embodiment.
Figure 12C:
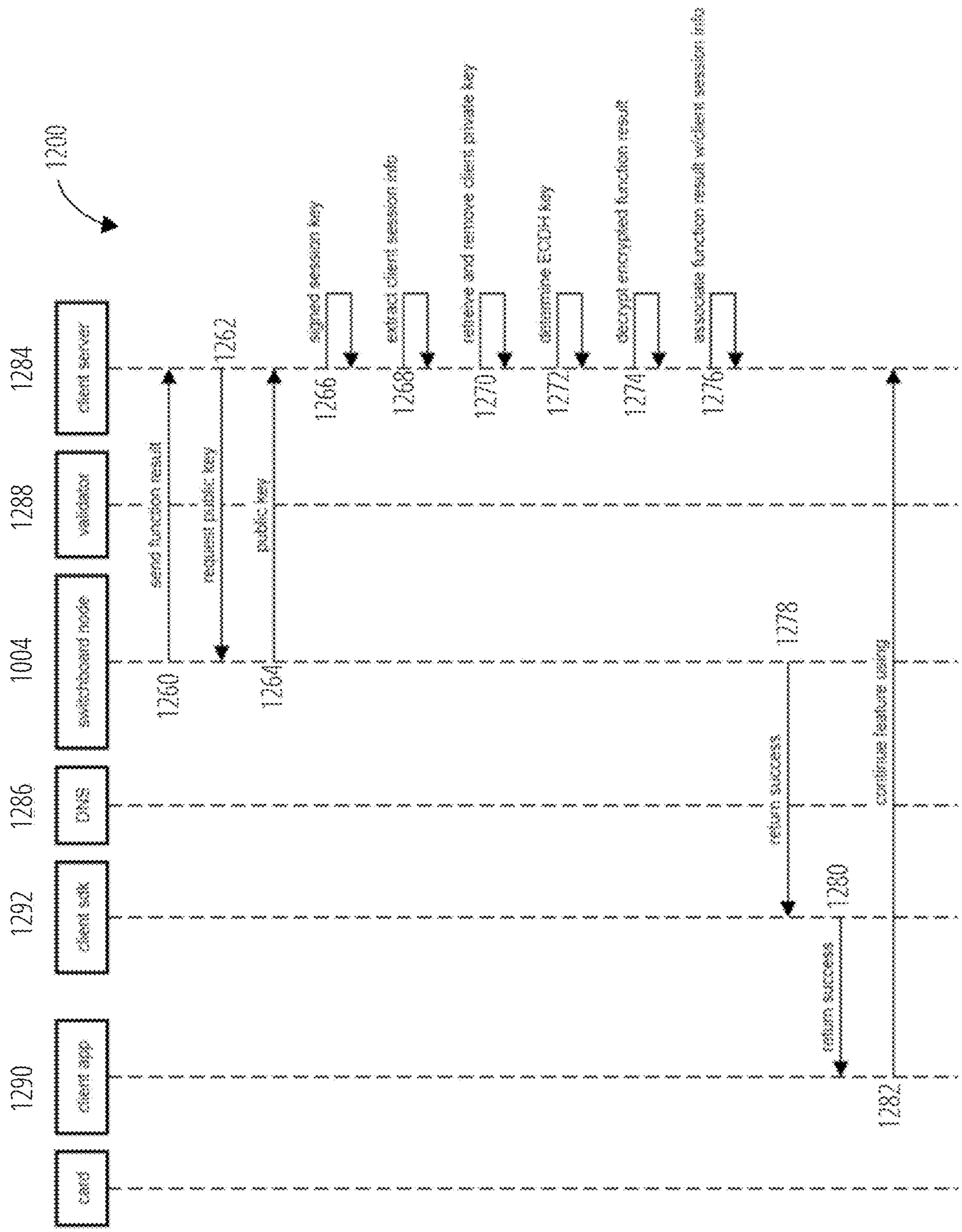
FIG. 12C illustrates an aspect of the subject matter in accordance with one embodiment.

FIG. 12A-FIG. 12C illustrate an example sequence 1200 to perform operations between a contactless card and services provided by a card issuer and/or merchant. The illustrated sequence 1200 includes actions and communications performed by a contactless card 102, a client 1036 including a client app 1290 and a client sdk 1292, a DNS 1286, a switchboard system including one or more nodes 1004, a partner services 1032 including a merchant and/or validator 1288, and control services 1034 including a client server 1284 or system. In embodiments, the client app 1290 may be any application configured to execute on a client 1036, such as a banking app, a merchant app, a social media app, a travel app, a gaming app, a productivity app, an entertainment app, and so forth. In embodiments, the client app 1290 includes a web browser to provide websites and pages. The client app 1290 may include and/or utilize the client sdk 1292, which may be a set of instructions that enable the client app 1290 to communicate with other components of the switchboard system.

In embodiments, at 1202 the client 1036 including the client app may send a request and establish a session with a client server 1284 such that a result may be associated with the correct client device or user. The request establishes a relationship between the client device and client server, which may be an issuer server. At 1204, the client server 1284 generates a session and CLIENT SESSION INFORMATION. At 1206, the client server 1284 returns the session information, e.g., the CLIENT SESSION INFORMATION. In embodiments, the CLIENT SESSION INFORMATION may be the Client implementation-specific user session identification information.

At 1208, the client 1036 may initiate a contactless card authentication process with the client 1036. For example, the client 1036 may call a function and/or pass information to the client 1036 to initiate authentication via a contactless card. At 1210-1214, the client 1036 may utilize DNS to identify a node and establish communication with the node. Specifically, at 1210, the client 1036 including the client sdk 1292 may send a request for switchboard hostnames, and at 1212 the DNS 1286 may return information including one or more hostnames. At 1214, the client 1036 may determine a switchboard node to communicate. FIG. 11 illustrates an example of a more detailed sequence of the process to establish communication with a switchboard node.

At 1216, the client 1036 may send a request for a session to the switchboard system 108. In embodiments, the request for a session may be for a function request in the format <FUNCTION REQUEST>. In embodiments, the FUNCTION REQUEST may be the data/function that the client would like to request once a contactless card has been validated. The function could be for any service discussed herein, e.g., authenticate the user, perform a transaction, request autofill data, etc. At 418, switchboard system 108 may generate a nonce and a signed session token. The signed session token may be a JSON Web Token (JWT). When generating the JWT, the following elements should be set:

iss: The unique ID of the current node,
nonce: An 8 hex character, randomly generated nonce,
exp: The expiration timestamp (+5 minutes),
client_id: The requesting client's Client ID,
sub: The requesting client's Device Fingerprint,
sid: Arbitrary session info sent from the client,
scope: The function being requested to be performed.

The nonce may be unique, random bytes generated to ensure the unrepeatability of a message with a contactless card. The nonce is critical to the security and operation of the switchboard system. The nonce validity is tracked by tying it to a session which can be validated by any member of the platform. As mentioned, sessions are JSON Web Tokens signed using a node-specific private key issued by the network. These JWTs are verifiable by a system with the corresponding public key, which they can also verify by confirming it was issued by us or an approved delegate. The signed session token is a JWT-generated token to establish the validity and expiration of the nonce and to associate the contactless card tap to the current client session. For example, the signed session token includes <NONCE>, <CLIENT SESSION INFO>, and <FUNCTION REQUEST> signed with <NODE PRIVATE KEY>, where the NODE PRIVATE KEY is the switchboard system 108 private key. The switchboard system 108 may include a NODE PUBLIC/PRIVATE KEY, which is a keypair used to sign and validate JWTs.

At 1220, the switchboard system 108 may return session information to the client 1036. The session information may include the signed session token (<SIGNED SESSION TOKEN>), the NONCE <NONCE>, the function terms of service <FUNCTION TOS>, and the terms of service version <TOS VERSION>. The FUNCTION TOS may be the terms of service that the user must consent to in order to allow the client to execute the requested function, and the TOS VERSION may be the version of the terms of service. At 422, the client sdk 236 may determine and/or receive user consent to the terms of service. In one example, the client sdk 236 captures and records the user consent to <FUNCTION TOS> on <CONSENT DATE> with <TOS VERSION>. The CONSENT DATE may be the timestamp for the user's consent to the TOS.

At 1224, the client 1036 exchanges one or more messages with a contactless card. In one example, the exchange may be based on the contactless card being tapped to a client device. In embodiments, the client sdk 236 may provide data to the contactless card 102 to use during the session to perform the function. The data may be provided to the contactless card 102 in an NDEF message. In one example, the data is written to the card in NDEF format using a binary update command. The data may include a NONCE to provide a level of security that the message received from the card is part of the same session. Additionally, the data may include additional information, such as one or more control bits to control the format generated by the contactless card. Table 3 below illustrates an example of an NDEF message format.

| | Data Item | Value |
|---|---|---|
| 00 | NDEF Message Tag | D1 (only record) |
| 01 | Length of Record Type | 01 |
| 02 | Length of Record | 33 |
| 03 | text record type | 54 |
| 04 | Length of Language | 02 |
| 05-06 | Language | 65 6E ("en") |
| 07 . . . 0E | NONCE | 8 bytes of ASCII HEX encoded 4 bytes binary data |
| 0F . . . 12 | Session Indicators | 4 bytes of ASCII HEX encoded 2 bytes binary data |
| 13 . . . 16 | Control Indicators | 4 bytes of ASCII HEX encoded 2 bytes binary data |
| 17 . . . 26 | Update Date creation Time | 16 bytes of ASCII HEX encoded 8 bytes binary data - represents 64 bit unix timestamp |
| 27 . . . 36 | Update MAC | MAC to protect control indicators - 16 bytes of ASCII HEX encoded 8 bytes binary data |

The updated MAC may be calculated to protect the control indicators in embodiments. Specifically, The MAC M is determined by calculating a MAC over the 10 bytes of the update data U with the Update MAC Card Key (MCK), as described in FIG. 4, flow 400.

At 1224, the contactless card may generate and provide a message to the client's device including the client sdk 1036. The data in the message may be utilized by the system discussed herein to perform the function requested. One example of the message is illustrated and discussed in FIG. 13, message 1300.

At 1226, the client including the client sdk 1036 may send a message and information to the switchboard system 108.

The message may be the message received from the contactless card 102, e.g., message 1300. In addition, the client sdk 1036 may send the consent date, the TOS version, and the signed session token to the switchboard system 108. The switchboard system 108 may utilize the information to ensure the session is valid. At 1228, the switchboard system 108 verifies the signed session token is valid, e.g., is the previously provided signed session token and includes the nonce previously generated and is in the message.

In some embodiments, the switchboard system 108 is configured to determine which issuer system or client-server it should route the message to for processing. At 1230, the switchboard system 108 may determine the issuer ID by extracting it from the message received from the contactless card 102 via the client sdk 1036. As mentioned, the issuer ID identifies the issuer of the contactless card 102.

In embodiments, the switchboard system 108 is configured to generate and communicate secure communications with the issuer system, e.g., the client server 1284 and the validator 1288. At 1232, the switchboard system 108 sends a request for a key to the client server 1284. The key may be utilized to perform secure communications. In one example, the key request may be an elliptical curve Diffie-Hellman (ECDH) key request. Embodiments are not limited in this manner. Alternative key protocols may be utilized, e.g., Supersingular isogeny Diffie-Hellman key exchange (SIDH or SIKE), a private/public key pairing (RSA), etc.

At 1234, the client server 1284 generates a portion of the key. In some instances, the client server 1284 may generate half of the ECDH key for encryption/decryption of PII. Specifically, the client server 1284 may generate <CLIENT EC PUBLIC KEY> and <CLIENT EC PRIVATE KEY> using Elliptic Curve P256. The CLIENT EC PUBLIC KEY AND CLIENT EC PRIVATE KEY is the first half of the ECDH key negotiation.

At 1236, the client-server 1284 stores the generated portion of the key in storage. Specifically, the client server 1284 may store <CLIENT EC PUBLIC KEY> and <CLIENT EC PRIVATE KEY> with <KEY ID>, where the KEY ID is used by the Client Server to cache its short-lived EC public/private key for later ECDH key completion, e.g., to identify the ECDH key portions to generate the whole ECDH key. In one example, the key may be stored in a secure memory location and may be used to when PII is received for the session.

In embodiments, the client server 1284 may return the public key portion to the switchboard system 108 with the KEY ID at 1238. The switchboard system 108 may store the public key portion with the KEY ID for later use, e.g., generation of the ECDH key. At 1240, the switchboard system 108 may request a validation to be performed by the validator 1288. In one example, the switchboard system 108 may send a request validation as Request validation <MESSAGE>, <SIGNED SESSION TOKEN>, <CLIENT EC PUBLIC KEY>, <CONSENT DATE>, and the <TOS VERSION>. The validator 488 may make an out-of-band request back to the switchboard system 108 for the public key to verify the session at 442. At 444, the switchboard system 108 may provide the node's public key, i.e., <NODE PUBLIC KEY>. Further at 446, the 488 may utilize the node's public key to verify the secure session token.

In embodiments, the validator 1288 may validate the message at 1248. In embodiments, the validator 1288 may perform a number of validations including ensuring the nonce in the message is correct along with additional information, such as the card's unique identifier (pUID), and the counter value (pATC). FIGS. 12A and 12 discuss additional details of a validation process that may be performed.

At 1250, the validator 1288 may store information associated with the session. For example, validator 1288 may store the <CONSENT DATE> with the <TOS VERSION> and the <PUID>. The validator 1288 may also generate another portion of the key, e.g., the ECDH key. For example, the 1288 may Generate <ISSUER EC PUBLIC KEY> and <ISSUER EC PRIVATE KEY> using Elliptic Curve P256. The ISSUER EC PUBLIC KEY and ISSUER EC PRIVATE KEY may be the second half of the ECDH key negotiation.

At 1254, the validator 1288 may generate the complete ECDH key. For example, the validator 1288 generates the <ECDH KEY> from <ISSUER EC PRIVATE KEY> and <CLIENT EC PUBLIC KEY>. The ECDH KEY is the final key generated using ECDH key negotiation.

The validator 1288 may utilize the ECDH KEY to encrypt data for the function. For example, if the validator 1288 validates the message in some instances, the validator 1288 may execute a function request to create a function result and encrypt the result with the ECDH KEY at 456. For example, the validator 488 may Execute <FUNCTION REQUEST> to create <FUNCTION RESULT> and encrypt it with the <ECDH KEY>. The function result may be any result based on the requested function, e.g., verification of the card.

At 1258, the validator 1288 may return the function result to the switchboard system 108. In some instances, the function result is returned encrypted. For example, the validator 1288 may return the <ENCRYPTED FUNCTION RESULT> and the <ISSUER EC PUBLIC KEY>.

In embodiments, the switchboard system 108 sends the function result to the client server 1284 to process the result. In one example, the switchboard system 108 may send the <ENCRYPTED FUNCTION RESULT>, <KEY ID>, <ISSUER EC PUBLIC KEY>, and <SIGNED SESSION TOKEN>. At 1262 and 1264, the client server 1284 may make a request for and receive the public key from the switchboard system 108. In some instances, the exchange may be performed via out-of-band communication channels. The public key for the node may be <NODE PUBLIC KEY>. The public key may be used to verify the sender of the function result, etc. At 1266, the 1284 may verify the signed session key with the node's public key <NODE PUBLIC KEY> to verify the sender of the information. At 1268, the client server 1284 may extract client information from the signed session token. For example, the client server 1284 may Extract <CLIENT SESSION INFO> from <SIGNED SESSION TOKEN>, i.e., extracting the client implementation-specific user session identification information.

Further, at 1270, the client server 1284 may retrieve the client's private key with the KEY ID. Specifically, the client server 1284 may get and remove the <CLIENT PRIVATE KEY> from cache using the <KEY ID>. At 1272, the client server 1284 may generate or compute the ECDH key. For example, the client server 1284 may compute the <ECDH KEY> with the <CLIENT PRIVATE KEY>+<ISSUER EC PUBLIC KEY>. The client server 1284 may decrypt the function result with the computed key at 1274. Specifically, the client server 1284 may decrypt the <ENCRYPTED FUNCTION RESULT> with the <ECDH KEY> to determine the <FUNCTION RESULT>. At 1276, the client server 1284 associates the function result with the session.

In embodiments, the switchboard system 108 may return whether the function result was successfully completed or not at 1278 to the client sdk 1292. Further at 1280, the client sdk 1292 may notify the client app 1290 of the result. At 1282, the client app 1290 may utilize the feature. For example, the 1282 may communicate with the client server 1284 to continue the feature using the <CLIENT SESSION INFO> to fetch the redacted <FUNCTION RESULT>.

Figure 13:
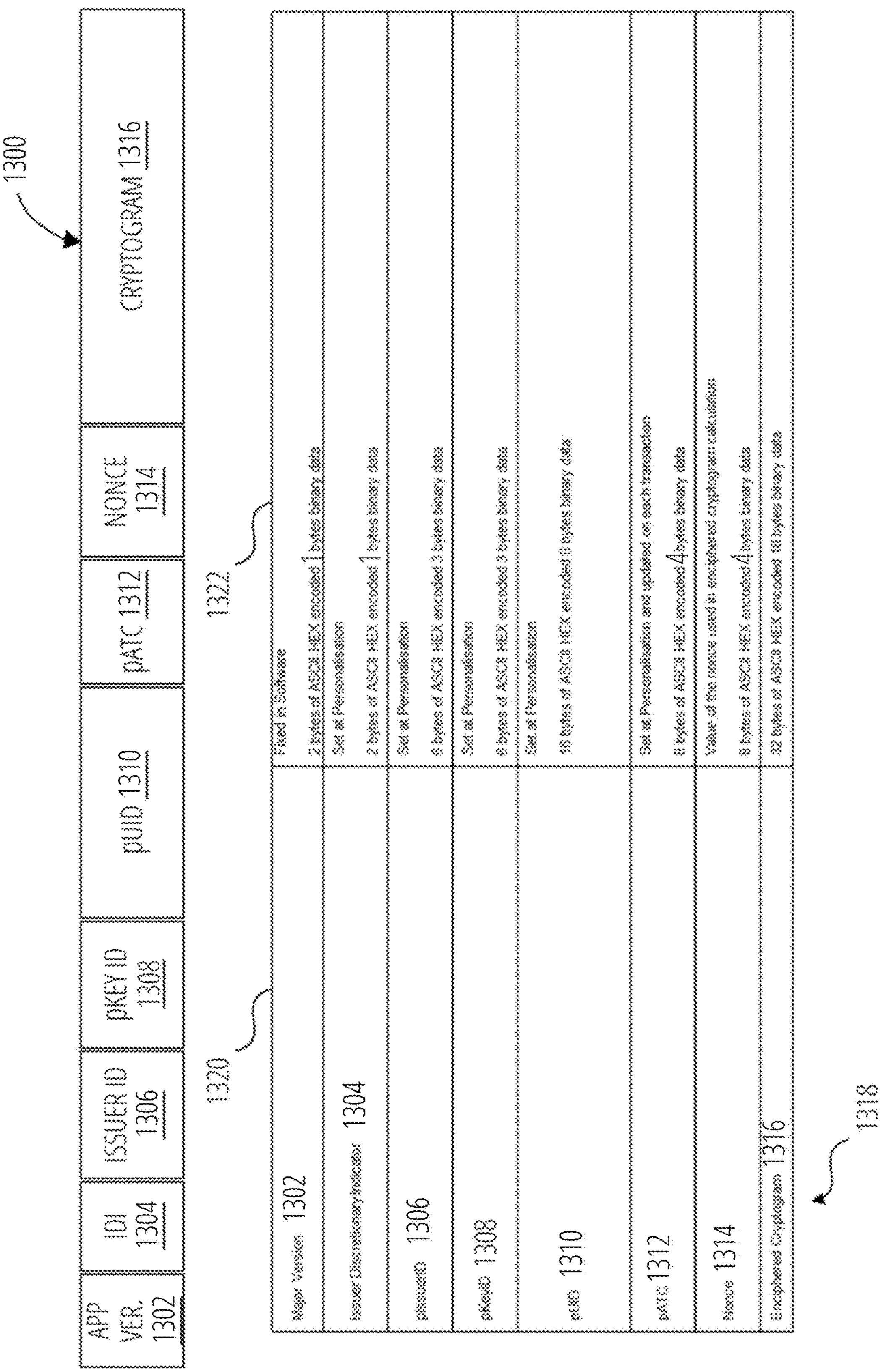
FIG. 13 illustrates an aspect of the subject matter in accordance with one embodiment.

FIG. 13 illustrates an example of a message 1300 that may be communicated by a contactless card to perform the functions described herein, such as those discussed in FIG. 12A through FIG. 12C. One or more of the fields in message 1300 may also be utilized to route the message 1300 through the switchboard system and perform authentication/validation techniques.

In embodiments, the message 1300 includes an applet version 1302 field, an issuer discretionary indicator 1304 field, an Issuer Identifier 1306 field, a pKey ID 1308 field, a pUID 1310 field, a pATC 1312 field, a nonce 1314 field, and an encrypted cryptogram 1316.

In embodiments, the fields may be in plain text or encrypted. For example, the applet version 1302 field may include an applet version in plain text. The applet version indicates which applet version is installed on a contactless card and may be used by the other systems to determine how to process the message 1300 when communicated. For example, different Applet versions require different validation logic, e.g., an older message may be routed through the issuer system to perform various operations for validation, while a newer message may be routed through the switchboard system to perform the various operations, including validation.

In embodiments, the message 1300 includes an issuer discretionary indicator 1304 field that may include issuer data and set at the time of personalization. In addition, the message 1300 includes an Issuer Identifier 1306 field that may include a unique ID assigned to the entity issuing the card, e.g., the issuer. For example, when joining the system, each issuer may be assigned a unique identifier during an onboarding operation. The issuer ID can be used by the switchboard system 1008 to route a message and its contents to the appropriate services that are associated with that particular issuer.

In embodiments, the message 1300 includes a pKey ID 1308 field. In some instances, the pKey ID 1308 field may include data that identifies a set of master keys for a card issuer. The issuer's set of master keys may utilize each card's set of derived master keys or unique derived keys (UDK). Further, each card's own set of master keys (UDKs) may be generated during the personalization of the card. The card's UDKs may be utilized to generate session keys that are used to generate the application cryptogram. The session keys generated by a card may be regenerated by a system, e.g., the validator system, utilizing pKeyID to identify the issuer's master keys to regenerate session keys by the system to perform a validation.

In embodiments, each contactless card 1002 is given a unique 16-decimal digit identity (pUID) at the time of personalization. Derivation of the card applet's unique keys using the pUID is performed off-card. The resultant Application Keys are injected during the personalization of the card. In embodiments, a card's Application Keys are the same as the card's derived master keys or UDKs. The process for deriving the Application Keys (UDKs) is described in FIG. 4, flow 400.

The message 1300 may include a pUID 1310 field, including a card unique identifier assigned to the contactless card at personalization time. The pUID 1310 field data may be a combination of alphanumeric characters used to identify each card and associated with a user uniquely.

In embodiments, the message 1300 includes a pATC 1312 field configured to hold a counter value. The counter value keeps a count of reads (taps) made on the contactless card in a hexadecimal format in one example. Further, a counter value may be used to generate session keys to encrypt at least a portion of a message.

In embodiments, each time a message 1300 is created, a new session key is derived and utilized to generate one or more portions of the message 1300. Specifically, a session key is used to calculate the cryptographic MAC (Application Cryptogram). The card's applet supports a session key derivation option to generate a unique cryptogram session key ASK, and a unique encipherment session key (DESK).

In embodiments, a portion of the data provided in message 1300 is static and set on the card during the personalization of the card and other data is dynamic and may be generated by the card during an operation, e.g., when a read operation is being performed. Note that in some instances, the static information may be updateable, but may require the customer and card to go through a secure update process, which may be controlled by the issuer.

In embodiments, the contactless card 1002 may communicate a message between a device, such as a mobile device, during a read operation. For example, in response to the contactless card 1002 being tapped onto a surface of the device, e.g., brought within wireless communication range, a read operation may be performed on the contactless card 1002, and the contactless card 1002 may generate and provide the message to the device. For example, once within range, the contactless card 1002 and the device may perform one or more exchanges for the contactless card 1002 to send the message to the device.

The wireless communication may be in accordance with a wireless protocol, such as near-field communication (NFC), Bluetooth, WiFi, and the like. In some instances, a message may be communicated between a contactless card 1002 and a device via wired means, e.g., via the contact pad, and in accordance with the EMV protocol.

As discussed above, the contactless card may be deployed with a unique card key, e.g., the UDK, that is generated from an issuer's master key and is used to generate session keys. The following discusses the generation of the UDK and the session keys (ASK) and (DESK). Further, the contactless card may generate encrypted data or a cryptogram comprising data as discussed herein with the generated keys. The encrypted data may be encrypted with session keys that are changed each time data is encrypted. In one embodiment, the session keys are generated from card master keys or unique diversified keys that are stored on the contactless card. The unique diversified keys may be generated from the issuer's master keys. For example, in some instances, operations to generate the unique diversified keys may be performed off the card at personalization time and then stored in the memory of the card. Further, the issuer's master key(s) may be utilized to generate card master keys. The card master keys may also be known as application keys or UDKs. Each contactless card may have one or more UDKs.

In embodiments, each contactless card includes one or more applications, such as an authentication application, that is given a unique 16-digit identity (pUID) at time of personalization. Each contactless card may also receive application keys, which may also be known as unique card keys (UDKs) or card master keys using the pUID. In some instances, these operations are performed off-card, and the resultant keys are injected during personalization. However, in other instances, one or more of the operations may be performed on the card, e.g., at the time of manufacturer, each time an operation is performed with a key, and so forth.

Embodiments include a system configured to generate a number of issuer master key sets and assign each a unique three-byte pKey identifier (pKey ID). As mentioned, systems discussed herein may support many card issuers, and each card issuer may have one or more of its own sets of unique issuer master keys that can be identified with a pKey ID. For each application, such as the authentication application, the system may perform the following operations to generate application keys or UDKs.

In embodiments, the system assigns a pKey ID to a card or pUID, a card application's unique 16-decimal digital identity. The system initiates generating a card's UDK(s). Specifically, the system generates a 16-digit quantity (X) from the 16-digit pUID. In one example, the 16-digit X may be generated by randomly rearranging the 16-digit pUID. In another example, X may be the same as the 16-digit pUID. Embodiments are not limited in this manner, and other techniques may be utilized to generate X from the 16-digit pUID. In embodiments, the 16-digit quantity X may be utilized to generate one or more UDKs.

In instances, the system computes or calculates a first portion (ZL) by encrypting X with an issuer master key. An encryption algorithm, such as DES or DES variant, may be utilized in embodiments. Embodiments are not limited in this manner, and other examples of encryption algorithms include AES and public-key algorithms, such as (RSA).

The system calculates or computes a second portion ZR by XOR'ing X with FFFFFFFFFFFFFFFF and encrypting the result with an issuer master key. Again, an encryption algorithm such as DES, AES, RSA, etc, may be used to encrypt the result of the XOR'ing. The system generates an application key or UDK. Specifically, the system concatenates ZL with ZR to form the application key. Embodiments are not limited to concatenating the two portions (ZL and ZR). They may be combined using other techniques. Additionally, the above-described process can be performed any number of times to generate additional application keys, e.g., by utilizing different master issuer keys. In embodiments, a contactless card stores the generated application key(s) or UDK(s).

In embodiments, the contactless card utilizes the application key(s) or UDK(s) to generate session keys for each encrypted data is generated. The following is one processing flow that may be performed by the contactless to generate a unique cryptogram session key (ASK).

To generate the ASK, the contactless card computes SKL by encrypting [ATC[2]||ATC[3]||'F0'||'00'||[ATC[0]||[ATC[1] ||[ATC[2]||[ATC[3]] with an application key. Further, the contactless card computes SKR by encrypting [ATC[2]||ATC [3]||'0F'||'00'||[ATC[0]||[ATC[1]||[ATC[2]||[ATC[3]] with the application key. Finally, the contactless card concatenates SKL with SKR to form an authentication session key (ASK). In embodiments, the ASK is used to perform operations utilizing the contactless card, such as encrypting the cryptographic MAC.

In embodiments, the contactless card also supports session key derivation to generate a unique encipherment session key DESK. The contactless card computes an SKL by encrypting [ATC[2]||ATC[3] ||'F0'||'00'||'00'||'00'||'00'||'00'] with a Data Encryption Key (DEK) or UDK. Further, the contactless card computes SKR by encrypting [ATC[2]||ATC[3] ||'0F'||'00'||'00'||'00'||'00'||'00'] with the DEK or UDK. The contactless card concatenates SKL with SKR to form the Data Encipherment Session Key (DESK).

In embodiments, the contactless card generates encrypted data or a cryptogram utilizing the session keys. Specifically, the contactless card generates a cryptogram C by calculating a MAC over the 32-byte transaction data T using the Authentication Session Key (ASK).

The contactless card may process the data to generate the cryptogram. Specifically, the contactless card divides T into four blocks of 8 bytes of data: T=T1||T2||T3||T4. The contactless card computes B=DES(ASKL) [T1], where is the Data Encryption Standard or another symmetric encryption algorithm, ASKL is a portion of the ASK, e.g., the "left" half of the key. The contactless card computes B=[B XOR T2], and, the contactless card computes B=DES(ASKL) [B], where DES is an encryption algorithm. The contactless card computes B=[B XOR T3], and the contactless card computes B=DES(ASKL) [B]. The contactless card computes B=[B XOR T4], and the contactless card computes B=DES (ASKL) [B]. The contactless card computes $B=DES^{-1}$ (ASKR) [B], where $DES^{-1}$ is the reciprocal DES operation, and ASKR is a portion of the ASK, e.g., the right half. The contactless card computes the cryptogram C=DES(ASKL) [B].

In embodiments, a contactless card may also encipher the cryptogram to secure the data further. For example, a contactless card may generate an 8-byte random number [RND] and the card computes E1=DES3(DESK) [RND], where DES3 is a symmetric encryption algorithm such as the Triple Data Encryption Standard. The contactless card then computes B=[E1] XOR [C], where C is the cryptogram generated, as discussed above. The contactless card computes E2=DES3(DESK) [B], where B is computed above. Further, the contactless card generates the 16-byte enciphered payload E=[E1]||[E2].

In embodiments, a device or the contactless card may decrypt the payload E by determining, receiving, or retrieving the payload E. The device computes a $RND=DES3^{-1}$ (DESK) [E1]. The device determines $B=DES3^{-1}$(DESK) [E2], and the device computes C=[E1] XOR [B].

In embodiments, the contactless generates or calculates a message authentication code (MAC). In some instances, the MAC may be an updated MAC. In embodiments, the updated MAC is included in data communicated from a contactless card to another device, such as a mobile device, point-of-sale (POS) terminal, or any other type of computer. In one example, the updated MAC may be included in an NDEF message.

In embodiments, the updated MAC may be calculated to protect the control indicators and include an updated date/time. For example, the update MAC M is determined by calculating a MAC over the 10 bytes of the updated data U with the Updated MAC Card Key (MCK) as follows.

Embodiments include determining data to process through a number of calculations and computations. In one example, the data U equals the [Control Indicators (2 bytes)||Update Date Time (8 bytes)||'80'||'00 00 00 00 00']. For the calculations, the data may be divided into two separate portions. Specifically, the data U is broken into two blocks of 8 bytes of data, where $U=U_1||U_2$. Further, operations may be performed on $U_1$ and $U_2$.

Embodiments include applying an algorithm to the first portion ($U_1$) of the data. In one example, a result B may be computed where B=DES(MCKL) [U1], where DES is a Data Encryption Standard algorithm using a first portion (L) of the MAC Card Key (MCKL).

Further, an additional operation may be performed on the result B. Specifically, the result B may be exclusively or'd (XOR) with a second portion of the data ($U_2$).

The updated result B may be further processed. For example, result B may be further processed by applying the DES algorithm using MCKL again to B. The result the inverse DES may process B with a second portion (R) of the MCK (MCKR), and the MAC M may be determined by applying the DES algorithm with the MCKL to result B.

Figure 14:
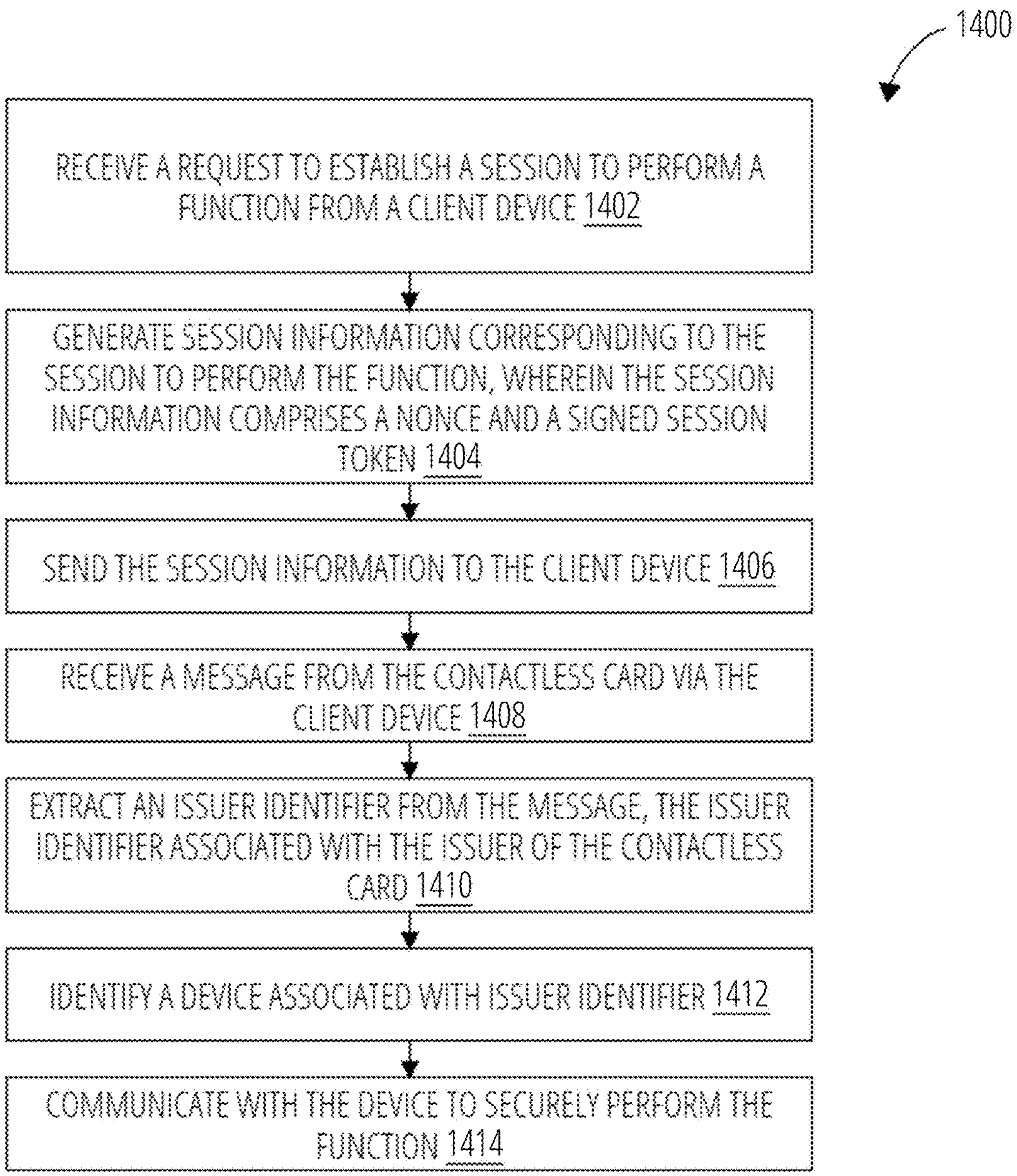
FIG. 14 illustrates a routine 1400 in accordance with one embodiment.

FIG. 14 illustrates an example of routine 1400 in accordance with embodiments discussed herein. In block 1402, the routine 1400 includes receiving, by a node in a system, a request to establish a session to perform a function from a client device, wherein the function is at least partially performed utilizing a contactless card. In some instances, the node may be one of a plurality nodes of a switchboard system. The node may be previously selected by the sending device via a DNS operation performed.

In block 1404, the routine 1400 includes generating, by the node, session information corresponding to the session to perform the function, wherein the session information comprises a nonce and a signed session token. The nonce and/or signed session token may be utilized by systems to perform the functions described herein while ensuring the node routing the data is authenticated, the message from the contactless card is authenticated, and to keep track of the session for the function.

In block 1406, routine 1400 includes sending the session information to the client device by the node. The client device may communicate with a contactless card to receive data from the card to authenticate and perform a function. In some instances, the client device may send the nonce from the node to the contactless card. The contactless card may utilize the nonce when generating the message to communicate back to the client device. Finally, the node, e.g., incorporates it into a cryptographic portion of the message (see FIG. 13).

In block 1408, routine 1400 includes receiving, by the node, a message from the contactless card via the client device. The message may be generated by the contactless card. FIG. 13 illustrates one example of a message 1300. In some embodiments, the node verifies the message. For example, the node may verify a nonce in the message and a signed session token.

In block 1410, routine 1400 extracts an issuer identifier from the message by the node, the issuer identifier associated with the issuer of the contactless card. In some instances, the issuer identifier may be in a plaintext format.

In block 1412, routine 1400 identifies, by the node, a device associated with the issuer identifier. For example, the node may perform a lookup to determine a server associated with the issuer identifier and the function to be performed.

In block 1414, routine 1400 communicates, by the node, with the device to securely perform the function.

Figure 15:
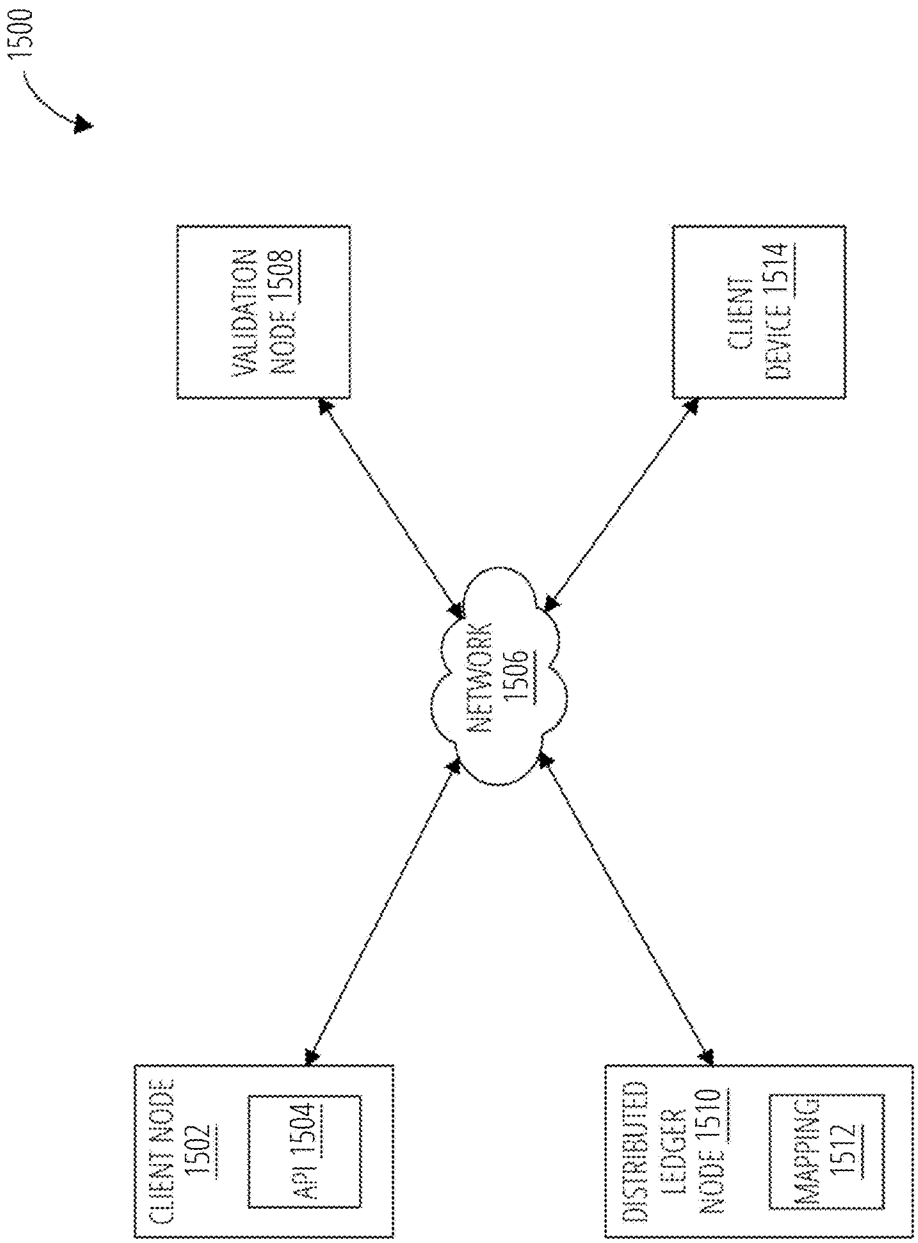
FIG. 15 illustrates an aspect of the subject matter in accordance with one embodiment.

FIG. 15 illustrates a distributed network authentication system 1100 according to an example embodiment. As further discussed below, system 1100 can include client node 1502, API 1504, network 1506, distributed ledger node 1510, mapping 1512, and client device 1514. Although FIG. 15 illustrates single instances of the components, system 1100 can include any number of components.

System 1100 can include a client node 1502, which can be a network-enabled computer as described herein. In some examples, client node 1502 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1100.

In some examples, client node 1502 can execute one or more applications, such as software applications, that enable, for example, network communications with one or more components of system 1100, transmit and/or receive data, and perform the functions and processes described herein.

The client node can contain an API 1504. For example, various different APIs can be provided for an application (e.g., executed on a computing device, such as a network-enabled computer) that can interact with a service. For example, an application executed on a device (e.g., a smart phone, smart watch, tablet, laptop, or other device) call interact with a web-based service by calling the API 1504 to interact with the service, such as by performing a remote call to an API for interacting with a web-based service.

API 1504 can be provided in the form of a library that includes specifications for routines, data structures, object classes, and variables. In some cases, such as for representational state transfer (REST) services, an API (e.g., a REST API or RESTful API, or an API that embodies some RESTful practices) is a specification of remote calls exposed to the API consumers (e.g., applications executed on a client computing device can be consumers of a REST API by performing remote calls to the REST API). REST services generally refer to a software architecture for coordinating components, connectors, and/or other elements, within a distributed system (e.g., a distributed hypermedia system).

Client node 1502 can communicate with one or more other components of system 1100 either directly or via network 1506. Network 1506 can comprise one or more of a wireless network, a wired network or any combination of wireless network and wired network, and may be configured to connect the components of system 1100. While FIG. 15 illustrates communication between the components of system 1100 through network 1506, it is understood that any component of system 1100 can communicate directly with another component of system 1100, e.g., without involving network 1506.

System 1100 can include a validation node 1508, which can be a network-enabled computer as described herein. In some examples, validation node 1508 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1100.

In some examples, validation node 1508 can execute one or more applications, such as software applications, that enable, for example, network communications with one or more components of system 1100, transmit and/or receive data, and perform the functions and processes described herein.

In some examples, each validation node can be associated with a routing number, and the routing number identifies the entity controlling the keys for the authentication namespace. The authentication namespace can be related to one or more of a particular entity, a particular set of cards, or a particular set of security keys (e.g., master keys, diversified keys, session keys) associated with an entity, a set of cards, or a type of cards.

System 1100 can include a distributed ledger node 1510, which can be a network-enabled computer as described herein. In some examples, distributed ledger node 1510 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1100.

In some examples, distributed ledger node 1510 can execute one or more applications, such as software applications, that enable, for example, network communications with one or more components of system 1100, transmit and/or receive data, and perform the functions and processes described herein.

Distributed ledger node 1510 can containing a mapping 1512. In some examples, mapping 1512 can be in the form of one or more databases. Exemplary databases can include, without limitation, relational databases, non-relational databases, hierarchical databases, object-oriented databases, network databases, and any combination thereof. The one or more databases can be centralized or distributed. The one or more databases can be hosted internally by any component of system 1100, or the one or more databases can be hosted externally to any component of the system 1100. In some examples, the one or more databases can be contained in the distributed ledger node 1510, and in other examples the one or more databases can be stored outside of distributed edger node 1510 but in data communication with distributed ledger node 1510. The one or more databases can be implemented in a database programming language. Exemplary database programming languages include, without limitation, Structured Query Language (SQL), MySQL, HyperText Markup Language, JavaScript, Hypertext Preprocessor Language, Practical Extraction and Report Language, Extensible Markup Language, and Common Gateway Interface. Queries made to the one or more databases can be implemented in the same database programming language used to implement the one or more databases. For example, if the one or more databases are an SQL database, then queries made to the database can be made in SQL (e.g., SELECT column1, column2 FROM table1, table2 WHERE column2='value';). It is understood that the one or more databases can be implemented in any database programming language and that the programming implementation of the query can be adjusted as necessary for compatibility with the one or more databases and to reflect the particular information to be queried.

In some examples, the one or more databases can be contained within distributed ledger node 1510. In other examples, the one or more databases can be remote from distributed ledger node 1510 but in data communication with distributed ledger node 1510. Data communication between the one or more databases and distributed ledger node 1510 can be a direct data communication or data communication via a network, such as the network 1506.

In some examples, client node 1502 can be in data communication with distributed ledger node 1510. Distributed ledger node 1510 can contain mapping 1512. Mapping 1514 may include, e.g., a mapping between a validation node address and the validation node 1508, a mapping between a routing number and a validation node address, and/or a mapping between a routing number and validation node 1508. In some examples, mapping 1512 can include a digital signature associated with an entity having permission to validate for a routing number. Based on one or more of these associations, client node 1502 can call validation node for validation and/or provide direction to the client device to reach the appropriate validation node. This can be accomplished by calling a validation API associated with validation node 1508.

In some examples, iterations of the mappings described herein, such as mapping 1512, can also include a software or applet version number. The version number can be used to identify a validation node or validation node address or choose between multiple validation addresses for one validation node.

In some examples, client node 1502 and distributed ledger node 1510 can be permissioned (e.g., allowed to join a network) with the aid of a certificate and/or a cryptographic authentication mechanism (e.g., a non-fungible token). The certificate and/or a cryptographic authentication mechanism may be issued by, e.g., a consortium authority or other administrative entity associated with the distributed network. If granted appropriate permissions, distributed ledger node 1510 can update mapping 1512 to reflect a different association between, e.g., a routing number, a validation node address, and a validation node. In some examples, degrees of permissions can be issued. For example, if client node 1502 were to function to route data to validation node 1508 (or other validation nodes), client node 1502 can be given a certain level of permissions. As another example, if distributed ledger node 1510 were to have the capability to update mapping 1512, distributed ledger node 1510 can have a different, higher level of permissions.

System 1100 can include a client device 1514, which can be a network-enabled computer as described herein. In some examples, distributed ledger node 1514 can be a server, which can be a dedicated server computer, a bladed server, or can be a personal computer, a laptop computer, a notebook computer, a palm top computer, a network computer, a mobile device, a wearable device, or any processor-controlled device capable of supporting the system 1100. Client device 1514 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In some examples, client device 1514 can be in data communication with another network-enabled computer not shown in FIG. 15, such as a smart card (e.g., a contactless card or a contact-based card).

In some examples, client device 1514 can execute one or more applications, such as software applications, that enable, for example, network communications with one or more components of system 1100, transmit and/or receive data, and perform the functions and processes described herein.

In some examples, upon receipt of an authentication request, client device 1514 can call (e.g., via an API) client node 1502. The call can include a routing number and/or an applet or software version number, and client node 1502 can query distributed ledger node 1510 and mapping 1512. Once the query returns the identification of a validation node (e.g., validation node 1508) and/or a validation node address associated with that routing number and/or applet or software version, client node 1502 can reply to client device 1514. Client device 1514 can then proceed with authentication with the validation node. The authentication can be performed by, e.g., the systems and methods described herein, such as by the generation, encryption, transmission, decryption, and validation of a cryptogram as described herein.

In some examples, client node 1502 can be co-resident with validation node 1508. In these examples, client node 1502 can handle the authentication in a single call from client device 1514. In some examples, this can be acceptable only if it is permissible for the full authentication transmission (e.g., a cryptogram as described herein) to be sent to client nodes that are not involved in authentication.

In some examples, if client node 1502 receives, from client device 1514, a routing number that is not handled by its location, client node 1502 can return a code indicating that this routing number is not handled, along with validation node address for the responsible validation node. Client device 1514 can then send the full authentication transmission to validation node 1508 using the received validation node address.

In some examples, client node 1502 can enter the distributed network with different permissions. For example, client node 1502 can be a read-only router of data. As another example, client node 1502 can have permission to send messages to distributed ledger node 1510 updating one or more routing paths for one or more routing numbers. However, client node 1502 would be prevented from updating one or more routing paths for one or more routing numbers for other entities that control other routing numbers which are not associated with client node 1502 or that did not grant this permission. As another example, distributed ledger node 1510 can contain contracts and/or records that can validate the permission of a specific entity to change a specific routing record based on its digital signature. As another example, the consortium authority or other administrative entity controlling the distributed network can have additional privileges to, without limitation, add new members (e.g., client nodes, distributed ledger nodes, validation nodes, and/or client devices), add new signature credentials, add new keys, add new certifications, and also to revoke any of the foregoing. In some examples, the foregoing permissions can be delegated to client node 1502, distributed ledger node 1510, and/or validation node 1508, if security, legal, and/or financial conditions are met, however, delegation is not required.

In some examples, one or more APIs can facilitate communication between components of system 1100 via network 1506. In other examples, one or more APIs are not required. Rather, the components of system 1100 could be in direct communication and/or dedicated to one or more specified entities, to allow the specified entities to keep data from being transferred to, transferred from, or transferred via, non-specified entities. This may further promote data security and avoid detection of data traffic patterns by non-specified entities.

In some examples, entities could establish a standard for nodes having APIs based on the intended function of those nodes. For example, a first standard could be established for data routing nodes and a second standard could established for nodes performing mapping and/or authentication functions. As another example, a routing API, a mapping API, and a validation API can be established, which can allow for the same device or hardware configuration to perform these functions. However, the use of keys, including secret keys by validation node 1508 for authentication, can require storage of the keys in one or more HSMs, to promote key security and ensure that the keys are never entered into memory.

Figure 16:
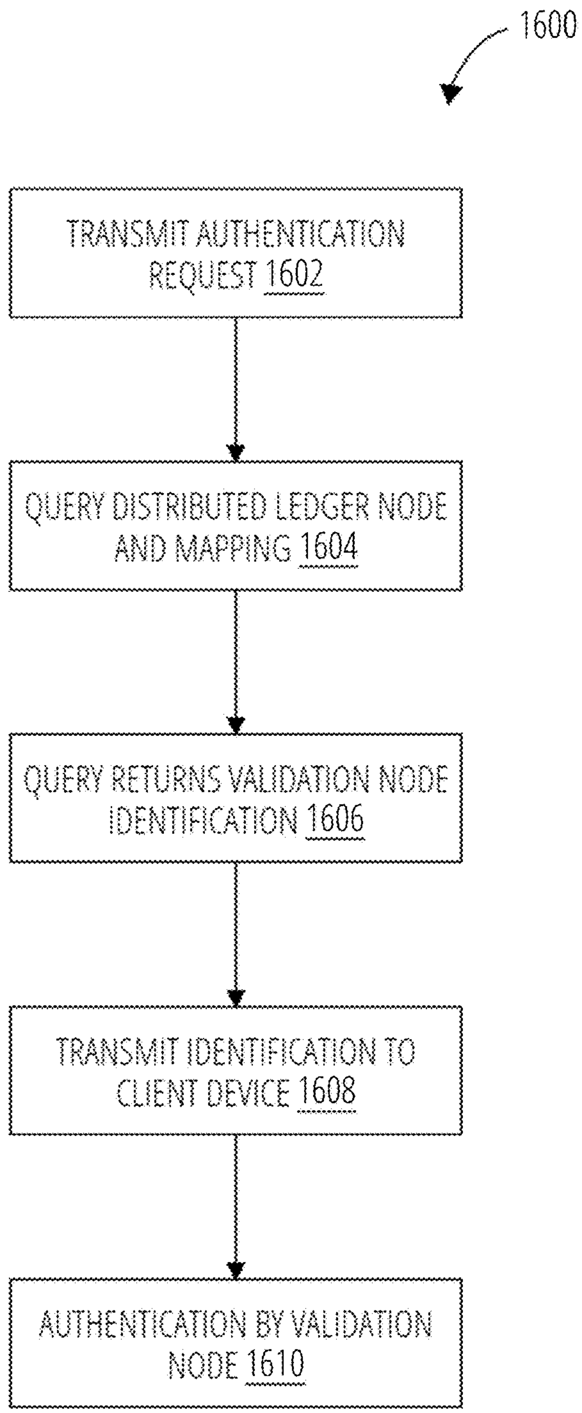
FIG. 16 illustrates an aspect of the subject matter in accordance with one embodiment.

FIG. 16 illustrates a method 1600 performed by a distributed network authentication system according to an example embodiment. For example, the method can be performed by distributed network authentication system 1500 and or by another distributed network authentication system.

In block 1602, a client device can transmit an authentication request to a client node. The authentication request can include, without limitation, a routing number, a software version number, and/or an applet version number. The request can be made by an API call or other communication between the client device and the client node.

In block 1604, after receiving the authentication request, the client node can transmit a query (e.g., via an API call) to a distributed ledger node. The distributed ledger node contain a mapping, and the distributed ledger node can submit the query to the mapping.

In block 1606, the query can return an identification of a validation node and/or a validation node address, and the distributed ledger node can transmit this identification to the client node.

In block 1608, the client node can transmit the identification to the client device. After receiving the identification, the client device can proceed with authentication with the identified validation node and/or validation node address, in block 1610.

Figure 17A:
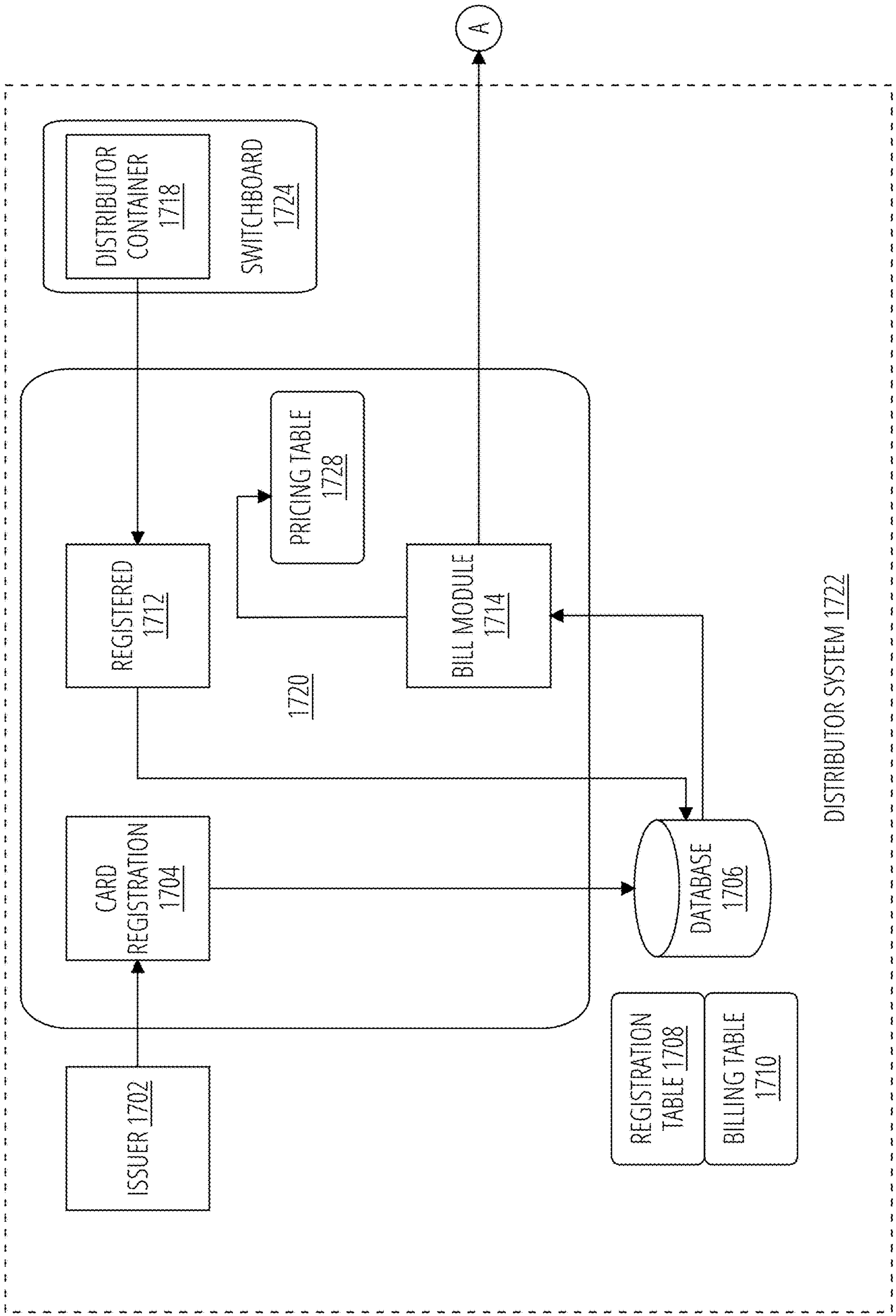
FIG. 17A illustrates an aspect of the subject matter in accordance with one embodiment.
Figure 17B:
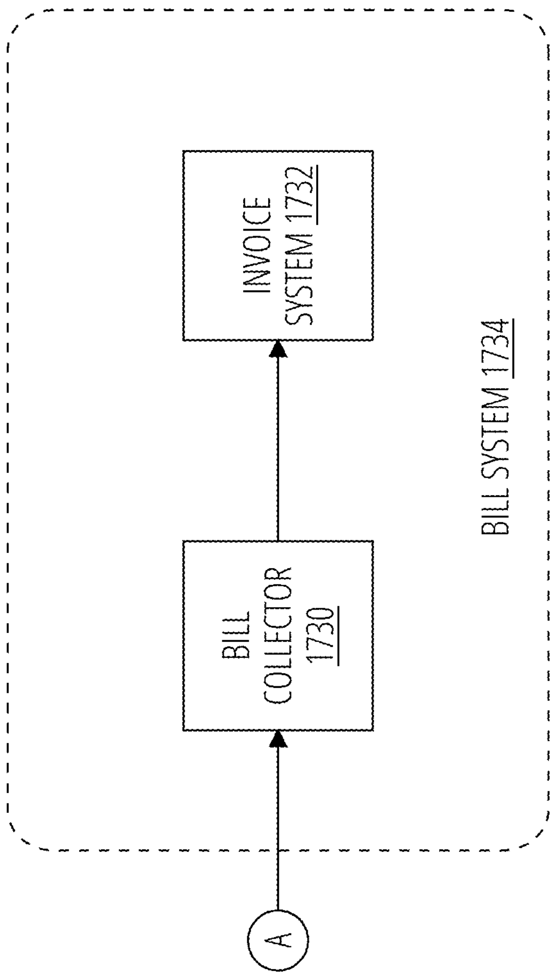
FIG. 17B illustrates an aspect of the subject matter in accordance with one embodiment.

FIG. 17A and FIG. 17B includes a Distributor system 1722 and a backend bill system 1734. The Distributor system 1722 includes a registration & billing system 1720 that may interface with a switchboard 1724. The registration & billing system 1720 includes a card registration API 1704, a registered API 1712, a bill module 1714, and a pricing table 1728.

In embodiments, the issuer 1702 refers to an entity responsible for issuing cards or providing access to payment services. The registration and billing system 1720 is a central system that manages card information and tracks billing transactions. The card registration API 1704 is a programmatic interface that enables the issuer to interact with the registration and billing system. This API allows the issuer to register and deregister cards, which involves adding or updating card data in the registration table 1708. The registration table 1708 is the card registration database 1706 that stores information about registered cards, including card numbers, expiration dates, and other relevant details. When a card is registered through the card registration API, its data is inserted into the registration table. Deregistering a card, as described, involves updating the card's status in the registration table to reflect that it is no longer active or registered. This does not remove the card's data from the table, but rather marks it as inactive or deregistered. This allows the issuer to keep track of cards that have been deactivated or no longer in use. The card registration API and registration table work together to manage card information and ensure that the issuer's records are up-to-date and accurate. This enables the issuer to perform billing services, verify card information, and manage card-related transactions efficiently. In summary, the card registration API is a key component of the registration and billing system, enabling the issuer to register and deregister cards, which are then stored in the registration table. This system allows the issuer to manage card information and perform billing services, while also maintaining accurate records of card activity.

In embodiments, the registration table 1708 is a database entity that stores information about registered cards. It contains fields for card details, including a unique card number, expiration date, card type, and issuer ID. Additionally, the table tracks the registration and deregistration dates for each card, as well as the card's current status, which can be active, inactive, or deregistered. This centralized repository provides a comprehensive and up-to-date record of all registered cards, enabling the registration and billing system to manage card information efficiently. The table is designed to accommodate large volumes of data and is updated in real-time whenever a card is registered, deregistered, or its status changes, ensuring that the system remains accurate and reliable. In some embodiments, the registration table 1708 may not be a table, but may be another stored in another form.

Alternatives to a traditional table for storing and managing card information in the registration and billing system include a database schema, which is a structured collection of data that defines the relationships between different card attributes. Another option is a data warehouse, a repository for storing large amounts of data from various sources, including card information, which can be analyzed and reported on. JSON repository is also an option, where a collection of JSON objects store card data, with each object representing a card and its attributes. A key-value store is another alternative, using a unique key to identify each card and storing its associated values for its attributes. Graph database is also a viable option, where each card is represented as a node and its relationships are represented as edges. Additionally, a CSV file can be used as a simple and lightweight storage solution for card data, which can be imported into a spreadsheet or other data analysis tool. Document-based database is another alternative, where data is stored as documents, with each document representing a card and its attributes. Lastly, object storage is also an option, where each object represents a card and its attributes, which can be accessed and manipulated as needed.

In embodiments, the switchboard 1724, e.g., switchboard system, may utilize the card registration database 1706 to determine whether a card is registered or not during operations. For example, switchboard 1724 calls the registered API 1712 to check whether a card is currently registered and will return true or false based on its status in the registration table 1708. In embodiments, the switchboard 1724 relies on the card registration database 1706 to ascertain the registration status of a card during its operations. This verification process involves a query to the registered API 1712, a specialized application programming interface designed to interact with the card registration database 1706.

When a card is presented to the switchboard 1724 for processing, it will initiate a call to the registered API 1712 to inquire about the card's registration status. The registered API 1712 will then access the card registration database 1706, which stores the registration information of all cards, including the registration table 1708. The registration table 1708 contains a record of all registered cards, including their card numbers, expiration dates, and other relevant attributes. Upon accessing the registration table 1708, the registered API 1712 will retrieve the registration status of the presented card. This status is typically indicated by a "yes" or "no" value, which is stored in the database to reflect whether the card is registered or not.

The registered API 1712 will then return a boolean value or other indication to the switchboard 1724, which will indicate whether the card is registered or not. This value can be: 1 True, if the card is registered 0 False, if the card is not registered This returned value will allow the switchboard 1724 to make informed decisions about the card's processing, such as: Allowing the card to be used for billing or payment transactions; Preventing the card from being used for billing or payment transactions; Triggering additional actions, such as sending notifications or updating the card's status. By leveraging the card registration database 1706 and the registered API 1712, the switchboard 1724 can efficiently and accurately determine the registration status of a card, ensuring seamless and secure operations throughout the registration and billing system. In embodiments, the card registration database 1706 is a distributor-owned database that stores the registration and billing tables, providing a centralized repository for the management and tracking of card registrations and associated data.

In embodiments, the card registration database 1706 includes the registration table 1708 and the billing table 1710. As mentioned, the registration table 1708 keeps track of registration status, including the original registration date, renewal date, and deregistration date. In one example, the registration table 1708 may be implemented in SQL. The SQL code defines the database structures necessary for managing card registration information within a specific schema named card_registration, for example. In one example, the SQL can be configured to establish a custom data type, such as registration_status_enum. This is an enumerated type (ENUM), meaning it predefines a fixed set of allowed string values. In this case, any data assigned this type can only hold the value 'active' or 'deregistered'. This enforces data integrity by ensuring that the status of a registration can only be one of these two valid states. Secondly, the SQL code defines the main data table, named registrations, also within the card_registration schema. In one example, the registration table 1708 stores individual registration records with several columns: puid (a required 16-character string, likely a unique identifier for the card or user), issuer_id (a required 6-character string identifying the card issuer), registration_date (a required timestamp automatically set to the time of creation), optional timestamps for renewal_date and deregistration_date, and a required status column. This status column utilizes the previously defined registration_status_enum type, restricting its value to 'active' or 'deregistered'. A composite primary key is defined on both puid and issuer_id, meaning that the combination of these two fields must be unique for each row, effectively preventing duplicate registrations for the same card from the same issuer.

In embodiments, the card registration database 1706 comprises a billing table 1710, a ledger that stores financial records for each card. The billing table 1710 records charges and refunds associated with each card, thereby maintaining a detailed history of transactions. In some embodiments, the system performs billing aggregation by analyzing the amounts stored in the billing table 1710 for each card issuer. This process involves compiling and summarizing the total charges and refunds for each issuer, enabling the system to generate accurate and up-to-date financial reports. The billing aggregation process may involve various calculations, such as: 1 Total charges: Summing the amounts of all charges associated with a specific issuer. 2. Total refunds: Summing the amounts of all refunds associated with a specific issuer. 3. Net balance: Calculating the difference between total charges and total refunds for a specific issuer. 4. Payment history: Analyzing the billing table 1710 to generate a payment history report for a specific issuer, highlighting past due amounts, payments made, and any outstanding balances. By performing billing aggregation, the system can provide valuable insights into the financial performance of each issuer, enabling more informed decision-making and optimized revenue management strategies.

In embodiments, the billing table 1710 may also implemented in SQL. For example, SQL may be configured to set up the database structures needed to record billing information related to card registrations within the card_registration schema. First, the SQL defines a custom data type named charge_type_enum. Again this is an enumerated type (ENUM) that restricts the possible values for a charge category to one of three specific options: 'registration', 'renewal', or 'deregistration'. Using this enum ensures that only valid, predefined types of charges can be associated with billing records, promoting data consistency.

Next, the SQL may create the billing table within the card_registration schema, ensuring it only does so if the table doesn't already exist. This table is designed to store individual billing transaction details. It includes columns to link back to the registration (puid and issuer_id), the specific charge_date (as a timestamp), the charge_type (which must use the previously defined charge_type_enum), the monetary amount of the charge (as an integer), and a creation_date timestamp that defaults to when the record is inserted. A composite primary key is established using issuer_id, puid, and charge_date, guaranteeing that no duplicate charge record exists for the same card/issuer combination at the exact same time. The SQL also defines a foreign key constraint (billing_puid_issuer_id_fkey) on the puid and issuer_id columns, referencing the corresponding columns in the card_registration.registrations table. This enforces referential integrity, ensuring that every billing entry is directly associated with a valid, existing card registration.

In embodiments, the registration & billing system 1720 includes a bill module 1714, which is a component for generating invoices and processing billing transactions. The bill module 1714 is configured to cross-check pricing data with the number of registered cards, which is leveraged for billing and invoice generation. This cross-checking process ensures that billing transactions are accurate and reflects the most up-to-date pricing information. The bill module 1714 leverages a pricing table 1716 that follows a defined pricing approach, which may vary depending on the specific requirements of the system. The pricing table 1716 includes the defined pricing approach, which is used to calculate the monetary amount of each charge. This approach is essential for determining the final amount due from the cardholder and for generating accurate invoices. In embodiments, the bill module 1714 is a Distributor container.

In one example, the pricing table 1716 describes pricing configurations in JSON for card issuers. A main structure may contain a list named issuers. The issuer object includes a list called pricingTables. The example shows one pricing table within this list. This table specifies its effective date (pricingTableEffectiveDate) and indicates that the pricing applies on a yearly basis (pricingFrequency). Within the table, there's a tiered pricing structure defined in the pricingTiers list. This structure outlines different price points based on volume or quantity, indicated by the threshold. For example, a first tier starts at a threshold of 0 and has an associated amount. The price decreases as volume increases, e.g., a threshold of 1,000,000 corresponds to a second amount, and a threshold of 2,000,000 corresponds to a third amount. Embodiments are not limited to this pricing configuration.

In embodiments, the bill module 1714 aggregates billing amounts for registration, deregistration, and renewal per issuer, sending the data to a backend bill system 1734. This aggregation is performed on a periodic basis, which can include monthly, semi-periodic, or on-demand, allowing for various update frequencies. The bill module 1714 provides the backend bill system 1734 with a comprehensive view of issuer-related billing activities. The bill collector API 1730 facilitates the transfer of billing data between the bill module 1714 and the backend bill system 1734. Upon receiving the aggregated billing amounts, the backend bill system 1734 can perform a range of functions, including processing and verifying the billing amounts, updating issuer records, generating invoices and payment notices, and integrating with payment gateways for processing payment transactions. The bill module 1714 also provides the backend bill system 1734 with additional information to support accurate processing and billing. This includes a Distributor ID, a bill date, and a list of issuers, which includes the volume of registered, deregistered, and renewed cards. This information enables the backend bill system 1734 to tailor its processing and billing activities to the specific needs of each issuer.

In embodiments, the bill module 1714 may send one or more records including the information to the backend bill system 1734. The billing record may be in a JSON format, and identifies the Distributor with a ID "alphanumeric value" and specifies the billing period as by month (or range of dates). The record may includes a list of issuers, which details transactions for multiple entities identified by their unique "issuerId".

For each issuer, the record breaks down transactions into three categories: "registration," "deregistration," and "renewal." Each category includes a "count," indicating the number of transactions of that type, and an "amount," representing the total monetary value associated with those transactions. For instance, issuer "000002" had 5 registrations totaling $2.00, 2 deregistrations resulting in a credit of $0.23 (indicated by the negative amount), and 6 renewals amounting to $2.40. Similarly, issuer "000003" had 123 registrations costing $47.97, 12 deregistrations crediting $1.56, and no renewals. This structure provides a detailed summary of billable activities per issuer for the specified distributor and billing period.

In embodiments, the backend bill system 1734 including the invoice system 1732 may utilize the transaction information to generate invoices for each of the issuers. The backend bill system 1734 may also, periodically, present a summary of card events by issuer in an aggregated view, which will include registrations, deregistrations, and renewals to facilitate billing.

In instances, when tiered pricing is utilized as described above, the backend bill system 1734 may determine every subsequent registered card beyond the pricing table tier threshold will be subject to the next tier. As an example, the first 100,000 enabled cards for Issuer A will be priced at a first price per card, 100,001-200,000 cards will be charged at second price, and 200,001+ cards will be charged at third price, for example. In some instances, renewal amounts may be priced at the total number of registered cards at the time of renewal. Based on the example given above, if 100,000 cards are registered in January 2025 at 40 cents per card and the next 100,000 cards are registered in June 2025 at 39 cents per card, when the first 100,000 cards are renewed in January 2026, they would be renewed at the rate for 200,000 cards (39 cents per card). In some instances, a pricing approaching may be updated/changed. When a new pricing approach the pricing table 1728 can be updated to include the next effective pricing arrangement.

What is claimed is:

1. A method, comprising:

generating, by a personalization system, card data comprising an issuer identifier and a unique identifier for a new contactless card, the issuer identifier to identify the issuer of the contactless card, and the unique identifier to identify the contactless card;

sending, by the personalization system, the card data to a registration system to register the new contactless card with the registration system comprising a card registration database, the registration system configured to separately manage and secure registrations for a plurality of independent issuers; and providing, by the personalization system, the card data to the new contactless card.

2. The method of claim 1 wherein sending the card data comprises the personalization system utilizing an application programming interface (API) exposed by the registration system, the API defining specific endpoints and data formats for submitting the card data.

3. The method of claim 1 wherein sending the card data comprises the personalization system sending the card data for a plurality of contactless cards associated with the issuer identifier together in a single batch file transmission to the registration system.

4. The method of claim 1 comprising receiving, by the registration system, the card data from the personalization system and storing the received registration data in association with the issuer identifier and the unique identifier, thereby registering the contactless card and enabling subsequent determination of the contactless card's registration status by authorized systems.

5. The method of claim 4 comprising communicating, by the registration system subsequent to storing the received card data, at least a portion of the stored card data or an update notification thereof to a validation system, the validation system being configured to use the communicated data to verify the registration status of the contactless card during validation operations.

6. The method of claim 5 wherein the validation system comprises a validation security system, and wherein communicating at least a portion of the stored registration data comprises storing the issuer identifier, the unique identifier, activation date, expiration date, an activation or deactivation status for the contactless card within the validation security system.

7. The method of claim 1 comprising:

generating, by the registration system, a change event notification upon storing the card data; and communicating, by the registration system, the change event notification to an analytics datastore, the change event notification indicating the registration of the contactless card is configured for billing.

8. A method for validating a contactless card operation, the method comprising:

establishing, by a switchboard node of a central switchboard system, a secure session for a request to perform an operation from a computing device including generating a nonce and a session token;

receiving, by a validation system coupled with the central switchboard system and from the computing device, a validation request initiated by a tap of a contactless card against the computing device, the validation request including the nonce, the session token, encrypted data generated by and obtained from the contactless card, an issuer identifier associated with an issuer of the contactless card, and a unique identifier associated with the contactless card;

verifying, by the validation system, the session token, and the nonce to associate the tap with the secure session;

determining, by the validation system, an active registration status for the contactless card by performing a lookup using the received issuer identifier and the received unique identifier against stored registration data;

authenticating, by the validation system, the received encrypted data originating from the contactless card; and authorizing, by the validation system, the operation associated with the tap upon determining that the registration status is active and that the encrypted data is successfully authenticated.

9. The method of claim 8 wherein the encrypted data is obtained by the computing device from the contactless card via a near-field communication (NFC) exchange during the tap.

10. The method of claim 8 wherein the encrypted data comprises a dynamically generated, one-time security token or cryptogram produced by an applet on the contactless card.

11. The method of claim 8 wherein determining the active registration status comprises the validation system performing the lookup within a validation security system, the validation security system storing registration data including at least activation dates, expiration dates, and deactivation flags synchronized from a registration system.

12. The method of claim 8 wherein determining the active registration status comprises the validation system sending a query, including the issuer identifier and the unique identifier, to a registration system via an application programming interface (API) endpoint and receiving a status response from the registration system.

13. The method of claim 8 wherein authenticating the received encrypted data comprises the validation system utilizing one or more cryptographic keys corresponding to the contactless card, wherein the cryptographic keys are associated with the issuer identifier and the unique identifier and were established during a personalization and registration process.

14. The method of claim 8 wherein the validation system is part of the central switchboard system configured to handle validation requests for multiple issuers, and wherein the method further comprises routing the received validation request within the switchboard system based at least in part on the received issuer identifier prior to determining the active registration status and authenticating the encrypted data.

15. A system for managing contactless card registrations and associated billing within a multi-issuer computing environment, the system comprising:

a processor; and a memory storing instructions that, when executed by the processor, configure the system to provide:

a card registration database configured to store registration data for contactless cards associated with a plurality of independent issuers, the registration data including at least an issuer identifier, a unique card identifier, and a registration status;

a card registration application programming interface (API) configured to receive registration requests and deregistration requests from the plurality of independent issuers and update the registration data in the card registration database;

a registered API configured to receive status queries comprising an issuer identifier and a unique card identifier, query the card registration database based on the received identifiers, and return an indication of the registration status; and a bill module configured to access the card registration database, determine billable events based on changes in registration status or predefined schedules, calculate charges based on a pricing table, and generate billing data for the plurality of issuers.

16. The system of claim 15 wherein the card registration database further comprises a registration table storing the issuer identifier, the unique card identifier, registration dates, deregistration dates, and the registration status, and a billing table storing records of charges and refunds associated with specific cards, linked to the registration table.

17. The system of claim 15 wherein the registered API is further configured to interface with a switchboard system, enabling the switchboard system to query the registration status of a contactless card via the registered API during card operations handled by the switchboard system.

18. The system of claim 15 wherein the pricing table stores tiered pricing information defining different charge amounts based on volumes of registered cards for an issuer, and wherein the bill module is configured to calculate charges using the tiered pricing information.

19. The system of claim 15 wherein the bill module is further configured to aggregate the generated billing data per issuer, including counts and total amounts for registrations, deregistrations, and renewals over a defined period, and communicate the aggregated billing data to a backend billing system via a bill collector API.

20. The system of claim 15 wherein the card registration database is implemented using a database language, comprising:

a registrations table with columns for unique identifiers, issuer identifiers, registration date, deregistration date, and status, wherein the status column uses an enumerated type restricted to 'active' or 'deregistered'; and a billing table with columns for the unique identifiers, the issuer identifiers, charge date, charge type, and amount, wherein charge type uses an enumerated type restricted to 'registration', 'renewal', or 'deregistration'.

* * * * *